United States Patent
Peng et al.

(10) Patent No.: US 11,573,357 B2
(45) Date of Patent: Feb. 7, 2023

(54) LENS ASSEMBLY HAVING CIRCULAR REFLECTIVE POLARIZER

(71) Applicant: Meta Platforms Technologies, LLC, Menlo Park, CA (US)

(72) Inventors: Fenglin Peng, Redmond, WA (US); Junren Wang, Mercer Island, WA (US); Yuge Huang, Oviedo, FL (US); Lu Lu, Kirkland, WA (US); Yusufu Njoni Bamaxam Sulai, Snohomish, WA (US); Ying Geng, Bellevue, WA (US); Jacques Gollier, Sammamish, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 25 days.

(21) Appl. No.: 17/093,609

(22) Filed: Nov. 9, 2020

(65) Prior Publication Data
US 2021/0173134 A1 Jun. 10, 2021

Related U.S. Application Data

(60) Provisional application No. 62/943,379, filed on Dec. 4, 2019.

(51) Int. Cl.
*G02F 1/1335* (2006.01)
*G02B 5/30* (2006.01)
(Continued)

(52) U.S. Cl.
CPC ............. *G02B 5/3016* (2013.01); *G02B 5/08* (2013.01); *G02B 7/02* (2013.01);
(Continued)

(58) Field of Classification Search
CPC ................ G02F 1/1333; G02F 1/1335; G02F 1/133526; G02F 1/133528;
(Continued)

(56) References Cited

U.S. PATENT DOCUMENTS

| 5,715,023 A | 2/1998 | Hoppe |
| 2010/0177113 A1 | 7/2010 | Gay et al. |

(Continued)

FOREIGN PATENT DOCUMENTS

EP 0718645 A2 6/1996

OTHER PUBLICATIONS

International Search Report and Written Opinion dated Mar. 17, 2021, in International Application No. PCT/US2020/062528, filed on Nov. 29, 2020 (10 pages).

(Continued)

*Primary Examiner* — Thoi V Duong
(74) *Attorney, Agent, or Firm* — Millburn IP PLLC

(57) ABSTRACT

A device includes a light source configured to generate an image light. The device also includes a lens assembly coupled with the light source. The lens assembly includes a mirror configured to transmit a first portion of the image light and reflect a second portion of the image light. The lens assembly also includes a reflective polarizer including a birefringent medium with a chirality and configured to substantially reflect the first portion of the image light output from the mirror as a polarized light having a predetermined handedness toward the mirror. The lens assembly further includes a lens disposed between the mirror and the reflective polarizer and configured to provide an optical power to the image light.

20 Claims, 19 Drawing Sheets

(51) Int. Cl.
*G02B 5/08* (2006.01)
*G02B 7/02* (2021.01)

(52) U.S. Cl.
CPC .. *G02F 1/133526* (2013.01); *G02F 1/133543* (2021.01); *G02F 1/133553* (2013.01)

(58) Field of Classification Search
CPC ......... G02F 1/133536; G02F 1/133541; G02F 1/133543; G02F 1/133553; G02F 1/1336; G02F 1/133602; G02F 1/13363; G02B 5/3016; G02B 5/08; G02B 5/10; G02B 7/02; G02B 27/0172; G02B 2027/0123
See application file for complete search history.

(56) References Cited

U.S. PATENT DOCUMENTS

| | | |
|---|---|---|
| 2017/0242258 A1 | 8/2017 | Edwards |
| 2019/0293978 A1* | 9/2019 | Chen .................... G02F 1/1396 |
| 2019/0353906 A1 | 11/2019 | Gollier et al. |

OTHER PUBLICATIONS

International Preliminary Report on Patentability for International Application No. PCT/US2020/062528, dated Jun. 16, 2022, 9 pages.

\* cited by examiner

LENS ASSEMBLY HAVING CIRCULAR REFLECTIVE POLARIZER

CROSS-REFERENCE TO RELATED APPLICATION

This application claims the benefit of priority to U.S. Provisional Patent Application No. 62/943,379, filed on Dec. 4, 2019, the entire content of which is incorporated by reference.

TECHNICAL FIELD

The present disclosure generally relates to optical devices and, more specifically, to a lens assembly having a circular reflective polarizer.

BACKGROUND

Near-eye displays ("NEDs") have been widely used in a large variety of applications, such as aviation, engineering, science, medicine, computer gaming, video, sports, training, simulations and other applications. One application of NEDs is to realize virtual reality ("VR"), augmented reality ("AR") and/or mixed reality ("MR"), or a combination thereof. It is often desirable to have NEDs that are compact and light weight, and have a high resolution, a large field of view ("FOV"), and small form factors. An NED generally includes a light source (e.g., a display element) configured to generate an image light and a lens system configured to direct the image light towards eyes of a user. The lens system includes multiple optical elements, such as lenses, waveplates, reflectors, etc., for focusing the image light to the eyes. To achieve a compact size and light weight while maintaining satisfactory optical characteristics, an NED often adopts a pancake lens in the lens system to fold the optical path, thereby reducing the back focal distance in the NED.

SUMMARY OF THE DISCLOSURE

One aspect of the present disclosure provides a device. The device includes a light source configured to generate an image light. The device also includes a lens assembly coupled with the light source. The lens assembly includes a mirror configured to transmit a first portion of the image light and reflect a second portion of the image light. The lens assembly also includes a reflective polarizer including a birefringent medium with a chirality and configured to substantially reflect the first portion of the image light output from the mirror as a polarized light having a predetermined handedness toward the mirror. The lens assembly further includes a lens disposed between the mirror and the reflective polarizer and configured to provide an optical power to the image light.

Another aspect of the present disclosure provides a lens assembly. The lens assembly includes a mirror configured to transmit a first portion of a light and reflect a second portion of the light. The lens assembly also includes a reflective polarizer including a birefringent medium with a chirality and configured to substantially reflect the first portion of the light output from the mirror as a polarized light having a predetermined handedness toward the mirror. The lens assembly further includes a lens disposed between the mirror and the reflective polarizer and configured to provide an optical power to the light.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1:
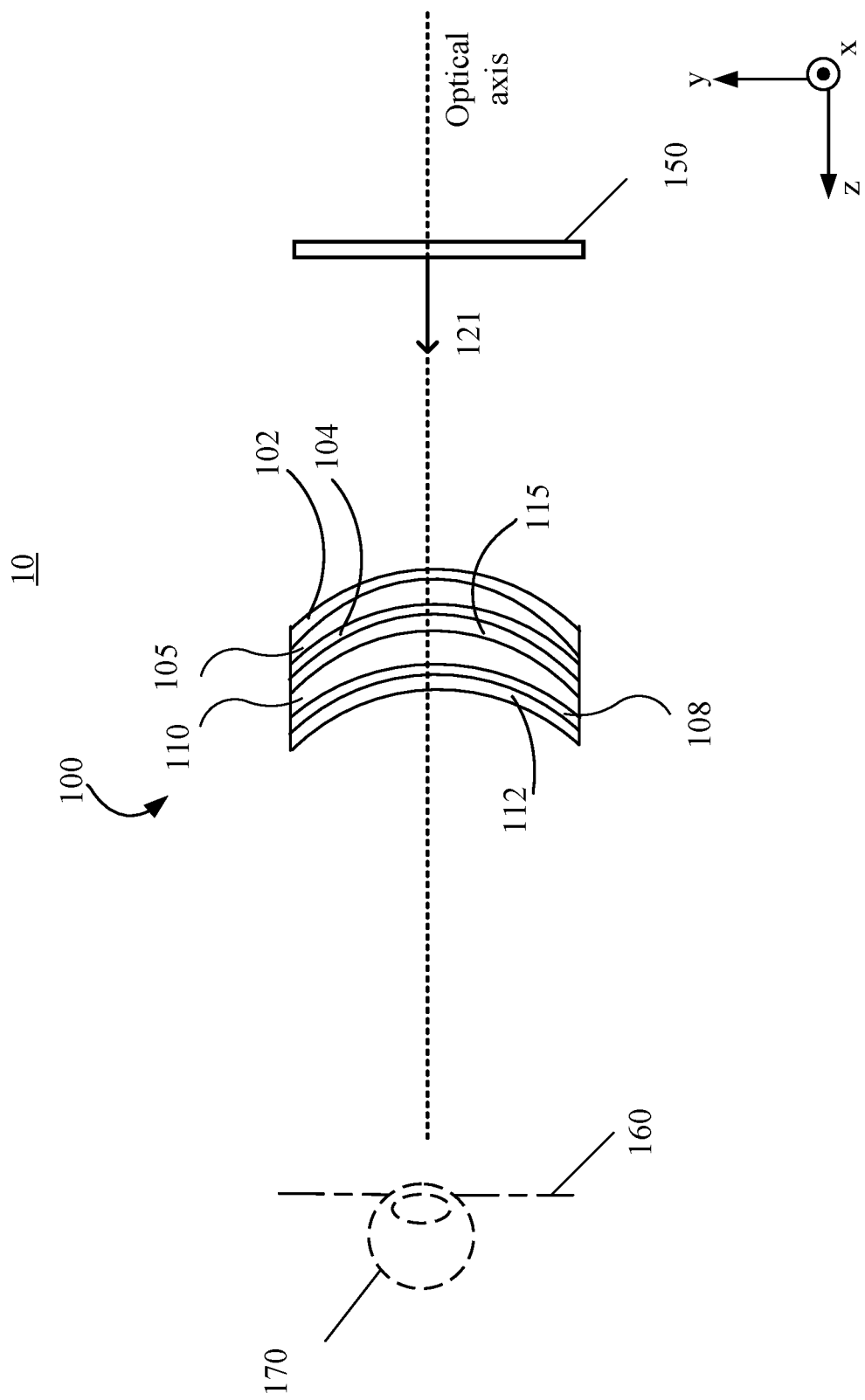
FIG. 1 illustrates a schematic diagram of an optical system including a pancake lens assembly, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "communicatively coupled" or "communicatively connected" indicates that related items are coupled or connected through an electrical and/or electromagnetic coupling or connection, such as a wired or wireless communication connection, channel, or network.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared wavelength range, or a combination thereof.

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The phrase "substantially (or primarily) transmitted" or "substantially (or primarily) reflected" or the like that describes a light means that a majority portion, including all, of a light is transmitted or reflected. In some situations, when a light is substantially transmitted, a small portion of the light may be reflected. When a light is substantially reflected, a small portion of the light may be transmitted. For example, when greater than 50 percent of the light is transmitted, the light may be referred to as being substantially transmitted. Likewise, when greater than 50 percent of the light is reflected, the light may be referred to as being substantially reflected. The actual percentage for determining whether the light is substantially reflected or transmitted may be any suitable percentage that may be determined based on a specific application, such as 90 percent, 80 percent, 70 percent, 60 percent, etc.

The present disclosure provides a device (e.g., an optical device) that may include a light source configured to generate a light, such as an image light. The device may include a lens assembly coupled with the light source and configured to guide the image light to an eye-box of the device. The lens assembly may include a mirror configured to transmit a first portion of the image light and reflect a second portion of the image light. The lens assembly may include a reflective polarizer including a birefringent medium with a chirality and configured to substantially (e.g., primarily) reflect the first portion of the image light output from the mirror as a first circularly polarized light having a first handedness toward the mirror. The lens assembly may include a lens disposed between the mirror and the reflective polarizer and configured to provide an optical power to the image light. The mirror may be further configured to reflect the first circularly polarized light having the first handedness as a second circularly polarized light having a second handedness opposite to the first handedness toward the reflective polarizer. The reflective polarizer may be further configured to substantially (e.g., primarily) transmit the second circularly polarized light having the second handedness.

In some embodiments, the chirality of the birefringent material may be a property of the birefringent material itself. For example, the birefringent material may include chiral crystal molecules, or molecules of the birefringent material may include a chiral functional group. In some embodiments, the chirality of the birefringent material may be introduced by chiral dopants doped into the birefringent material. In some embodiments, the birefringent material with a chirality may include twist-bend nematic liquid crystals ("LCs") (or LCs in twist-bend nematic phase), in which the LC directors may exhibit periodic twist and bend deformations forming a conical helix with doubly degenerate domains having opposite handedness. The LC directors in twist-bend nematic LCs may be tilted with respect to the helical axis and, thus, twist-bend nematic phase may be considered as the generalized case of the nematic phase in which the LC directors are orthogonal to the helical axis. Cholesteric liquid crystals ("CLCs") are a type of birefringent material or medium with a chirality. In the following descriptions, for illustrative purposes, CLCs are used as an example of the birefringent material or medium with a chirality. CLC reflective polarizers (i.e., reflective polarizers based on CLCs) are used as example reflective polarizers based on the birefringent material with a chirality. In some embodiments, reflective polarizers that are configured based on another suitable birefringent material with a chirality may also be implemented in the disclosed device or lens assembly following the same design principles for the device including the CLC reflective polarizer as described below.

FIG. 1 illustrates a schematic diagram of a system (e.g., an optical system) 10 including a lens assembly 100, such as a pancake lens assembly 100, according to an embodiment of the present disclosure. In the following descriptions, the lens assembly 100 is referred to as a pancake lens assembly 100. The pancake lens assembly 100 may be implemented into an NED to fold the optical path, thereby reducing the back focal distance in the NED. For example, the optical system 10 may be part of the NED. As shown in FIG. 1, the system 10 may include an electronic display or a light source assembly (or a light source) 150 configured to emit an image light 121 (representing a virtual image). The pancake lens assembly 100 may focus the image light 121 emitted from the electronic display 150 to an eye-box of the system 10 located at an exit pupil 160. The exit pupil 160 may be a spatial region in an eye-box where an eye 170 may be positioned when a user wears the NED. In some embodiments, the electronic display 150 may be a monochromatic display that includes a narrowband monochromatic light source (e.g., a 10-nm-bandwidth light source). In some embodiments, the electronic display 150 may be a polychromatic display (e.g., a red-green-blue (RGB) display) that includes a broadband polychromatic light source (e.g., 300-nm-bandwidth light source covering the visible wavelength range). In some embodiments, the electronic display 150 may be a polychromatic display (e.g., an RGB display) formed by stacking multiple monochromatic displays, which include corresponding narrowband monochromatic light sources respectively.

In some embodiments, the pancake lens assembly 100 may include a first optical element 105 and a second optical element 110 that are coupled together to form, for example, a monolithic optical element. In some embodiments, one or more surfaces of the first optical element 105 and the second optical element 110 may be configured with a shape, e.g., to correct a field curvature. For example, one or more surfaces of the first optical element 105 and the second optical element 110 may be configured with a spherically concave shape (e.g., a portion of a sphere), a spherically convex shape, a rotationally symmetric asphere shape, a freeform shape, or other shapes that may mitigate a field curvature. In some embodiments, the shape of one or more surfaces of the first optical element 105 and the second optical element 110 may be configured to additionally correct other forms of optical aberrations. In some embodiments, the first optical element 105 and the second optical element 110 may function as a first lens 105 and a second lens 110, respectively. In some embodiments, one of the first optical element 105 and the second optical element 110 may be a lens, and the other one may be another suitable type of optical element other than a lens. In some embodiments, one or more of the optical elements within the pancake lens assembly 100 may have one or more coatings, such as anti-reflective coatings, to reduce ghost images and enhance contrast.

In some embodiments, the first optical element 105 and the second optical element 110 may be coupled (e.g., bonded) together by an adhesive 115. At least one (e.g., each) of the first optical element 105 and the second optical element 110 may include one or more optical lenses. The first optical element 105 may include a first surface facing a direction toward the electronic display 150 and a second surface facing a direction toward the eye 170. In some embodiments, a first circular absorptive polarizer 102 may be disposed at the first surface of the first optical element 105 facing the electronic display 150. In some embodiments, the first circular absorptive polarizer 102 may be a layer or coating disposed at (e.g., bonded to or formed on) the first surface of the first optical element 105. In some embodiments, the first circular absorptive polarizer 102 may be disposed at (e.g., bonded to or formed on) a second surface of the first optical element 105 facing the eye 170. The first circular absorptive polarizer 102 may be configured to convert an unpolarized image light 121 emitted from the electronic display 150 into a circularly polarized light with a predetermined handedness. In some embodiments, when the image light 121 output from the electronic display 150 is a circularly polarized light with the predetermined handedness, the first circular absorptive polarizer 102 may be omitted.

In some embodiments, the image light 121 output from the electronic display 150 may be a linearly polarized light, and the first optical element 105 may include a quarter-wave plate ("QWP") in place of the first circular absorptive polarizer 102. The QWP may include a polarization axis, which may be oriented relative to the polarization direction of the linearly polarized image light to convert the linearly polarized image light to a circularly polarized light for a visible spectrum and/or an infrared spectrum. In some embodiments, for an achromatic design, the QWP may include a multilayer birefringent material (e.g., polymer or liquid crystals) configured to produce a quarter-wave birefringence across a wide spectral range. In some embodiments, for a monochrome design, an angle between the polarization axis (i.e., fast axis) of the QWP and the polarization direction of the incident linearly polarized light may be approximately 45 degrees.

The pancake lens assembly 100 may include a mirror 104 disposed at the first surface or second surface of the first optical element 105. In some embodiments, regardless of which surface of the first optical element 105 on which the mirror 104 and the first circular absorptive polarizer 102 are disposed, the first circular absorptive polarizer 102 may be disposed between the mirror 104 and the electronic display 105. The mirror 104 may be a layer or coating that is disposed at (e.g., bonded to or formed on) the first or second surface of the first optical element 105. For discussion purposes, FIG. 1 shows that the mirror 104 is disposed at (e.g., bonded to or formed on) the second surface of the first optical element 105. The mirror 104 may be a partial reflector that is partially reflective to reflect a portion of the received image light, and partially transmissive to transmit another portion of the received image light. In some embodiments, the mirror 104 may be configured to transmit about 50% of an incident light and reflect about 50% of the incident light. Such a mirror may be referred to as a 50/50 mirror.

The second optical element 110 may have a first surface facing the first optical element 105 and an opposing second surface facing the eye 170. The pancake lens assembly 100 may include a circular reflective polarizer 108 disposed at the first surface or the second surface of the second optical element 110. The circular reflective polarizer 108 may be a layer or coating disposed at (e.g., bonded to or formed on) the first or second surface of the second optical element 110. For discussion purposes, FIG. 1 shows that the circular reflective polarizer 108 is disposed at (e.g., bonded to or formed on) the second surface of the second optical element 110. The circular reflective polarizer 108 may function as a partially reflective polarizing film that substantially (e.g., primarily) reflects a received light of a first polarization and substantially (e.g., primarily) transmits a received light of a second polarization. In some embodiments, the circular reflective polarizer 108 may be configured to substantially (e.g., primarily) reflect or transmit a circularly polarized light depending on the handedness of the circular polarization of the light. In some embodiments, the circular reflective polarizer 108 may be a cholesteric liquid crystal ("CLC") reflective polarizer (for discussion purposes, the circular reflective polarizer 108 may also be referred to as a CLC reflective polarizer 108). The details of CLCs and CLC reflective polarizers will be described with reference to FIGS. 2A-2B and FIGS. 3A-3C.

In the embodiment shown in FIG. 1, the mirror 104 is disposed at the second surface of the first optical element 105, and the circular reflective polarizer 108 is disposed at the second surface of the second optical element 110. The adhesive 115 may bond the mirror 104 disposed at the second surface of the first optical element 105 and the first surface of the second optical element 110. In some embodiments, the mirror 104 may be disposed at the first surface of the first optical element 105 and the circular reflective polarizer 108 may be disposed at the first surface of the second optical element 110. The adhesive 115 may bond the second surface of the first optical element 105 and the circular reflective polarizer 108 disposed at the first surface of the second optical element 110. In some embodiments, the mirror 104 may be disposed at the first surface of the first optical element 105 and the circular reflective polarizer 108 may be disposed at the second surface of the second optical element 110. The adhesive 115 may bond the second surface of the first optical element 105 and the first surface of the second optical element 110.

In some embodiments, the pancake lens assembly 100 may include a second circular absorptive polarizer 112 configured to reduce or eliminate an undesirable ghost image formed by the image light directly transmitted from the electronic display 150 toward the eye 170. The second circular absorptive polarizer 112 may be disposed at the second surface of the second optical element 110, between the circular reflective polarizer 108 and the eye 170. The second circular absorptive polarizer 112 may be configured to block (e.g., absorb) or transmit a circularly polarized light depending on the handedness of the circularly polarized light. For example, the second circular absorptive polarizer 112 may be configured to transmit a circularly polarized light (or a circularly polarized light component) having a predetermined handedness and block (e.g., absorb) a circularly polarized light (or a circularly polarized light component) having an opposite handedness (e.g., a handedness opposite to the predetermined handedness). In some embodiments, the second circular absorptive polarizer 112 may also function as an anti-narcissus film. When the user wears the NED, an ambient light incident onto eyes of the user may be scattered by the eyes, then reflected from the electronic display 150 toward the eyes. As a result, the user may perceive an image of his or her own eyes. Such a phenomenon is referred as narcissus. The second circular absorptive polarizer 112 functioning as an anti-narcissus film may be configured to suppress the narcissus such that the user may not perceive images of his or her own eyes. In some embodiments, the second circular absorptive polarizer 112 may be a film disposed at (e.g., bonded to or formed on) the first surface of the second optical element 110.

Figure 2A:
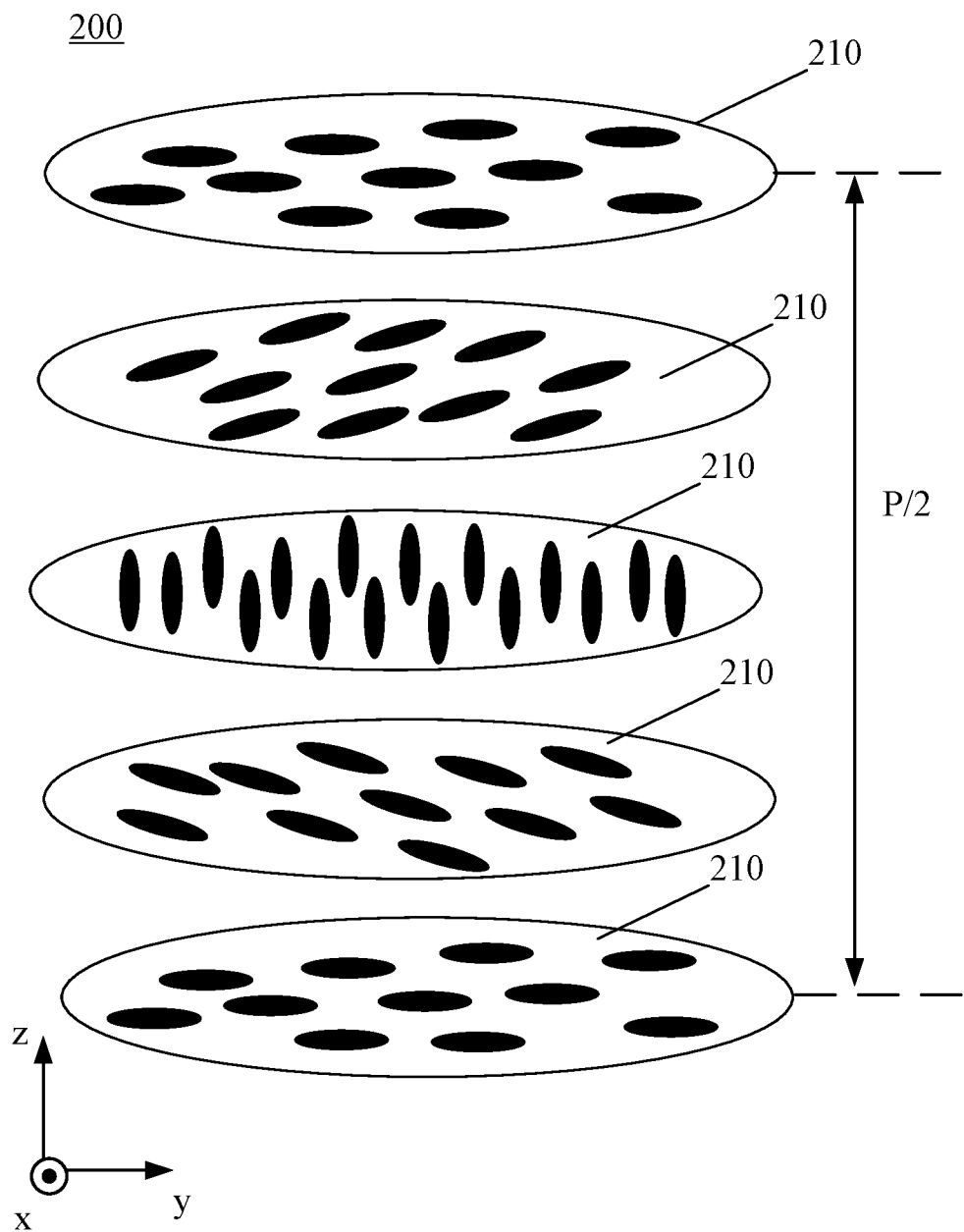
FIG. 2A illustrates a schematic diagram of a director configuration in cholesteric liquid crystals ("CLCs"), according to an embodiment of the present disclosure.
Figure 2B:
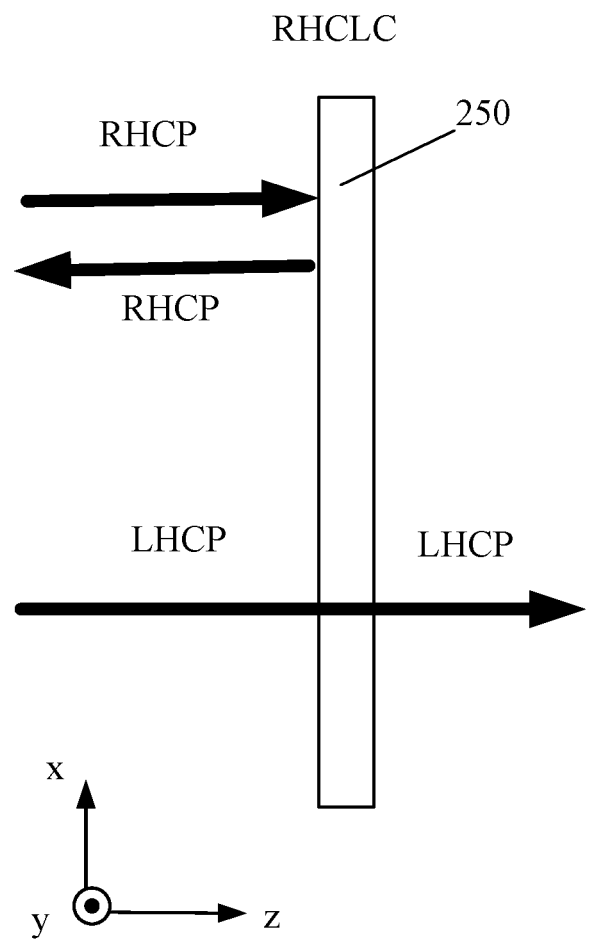
FIG. 2B illustrates polarization selective reflectivity of the CLCs shown in FIG. 2A, according to an embodiment of the present disclosure.

In some embodiments, the circular reflective polarizer 108 may be a CLC reflective polarizer having a structure shown in FIG. 2A and FIG. 2B. FIG. 2A illustrates a schematic diagram of a director configuration 200 of cholesteric liquid crystals ("CLCs"), and FIG. 2B illustrates polarization selective reflectivity of the CLCs shown in FIG.

2A, according to an embodiment of the present disclosure. CLCs are liquid crystals that have a helical structure and, thus, exhibit a chirality, i.e., a handedness. CLCs are also known as chiral nematic liquid crystals. As shown in FIG. 2A, nematic LC molecules may be represented by solid rods. CLCs may be arranged in layers 210 with no positional ordering within the layers 210. The nematic LC directors (e.g., long axes of the CLC molecules) may rotate along an axial direction (or helical axis direction) (e.g., z-direction shown in FIG. 2A) of the layers 210 due to the presence of a chiral dopant. Within the same layer 210, the LC directors may be oriented in the same direction. The spatial variation of the LC directors may be periodic. The period of the variation, i.e., an axial length or distance over which the LC directors rotate by 360°, may be referred to as a helix pitch P. In some embodiments, the spatial variation of the orientations of the LC directors may repeat at every half-pitch (2/P), because the LC directors oriented at 0° and ±180° are equivalent. The helix pitch P may determine a reflection band of the CLCs, i.e., a band of wavelengths of incident lights that may be reflected (e.g., through Bragg Reflection) by the CLCs. In some embodiments, the helix pitch P may be of the same order as the wavelengths of visible lights. The reflection band of the CLCs may be centered at $\lambda_0 = n*P$, where n is average refractive index of the CLCs, which may be expressed as $n = (n_e + n_o)/2$, where $n_e$ is the extraordinary refractive index and $n_o$ is the ordinary refractive index. The reflection bandwidth $\Delta\lambda = \Delta n*P$ of the CLCs may be proportional to the birefringence $\Delta n$ of the CLCs, where $\Delta n = n_e - n_o$. For an incident light having a wavelength within the reflection band of the CLCs, a circularly polarized incident light with the same handedness as that of the helix structure of the CLCs may be substantially (e.g., primarily) reflected, whereas a circularly polarized light with the opposite handedness may be substantially (e.g., primarily) transmitted. For both the reflected and transmitted lights, the polarization states may be unchanged. For example, as shown in FIG. 2B, a right-handed CLC ("RHCLC") 250 may exhibit a high reflection characteristic for a right-handed circular polarized ("RHCP") light and a high transmission characteristic for a left-handed circular polarized ("LHCP") light. That is, for an incident light having a wavelength within the reflection band of the RHCLC 250, the RHCLC 250 may substantially (e.g., primarily) reflect an RHCP light and primary transmit an LHCP light. When the incidence wavelength is not within the reflection band of the CLCs, a circularly polarized incident light may be transmitted by the CLCs regardless of the handedness. An unpolarized light or a linearly polarized light may be decomposed into an RHCP light (or an RHCP component) and an LHCP light (or an LHCP component), and the RHCLC 250 may substantially (e.g., primarily) reflect the RHCP component and substantially (e.g., primarily) transmit the LHCP component.

Figure 3A:
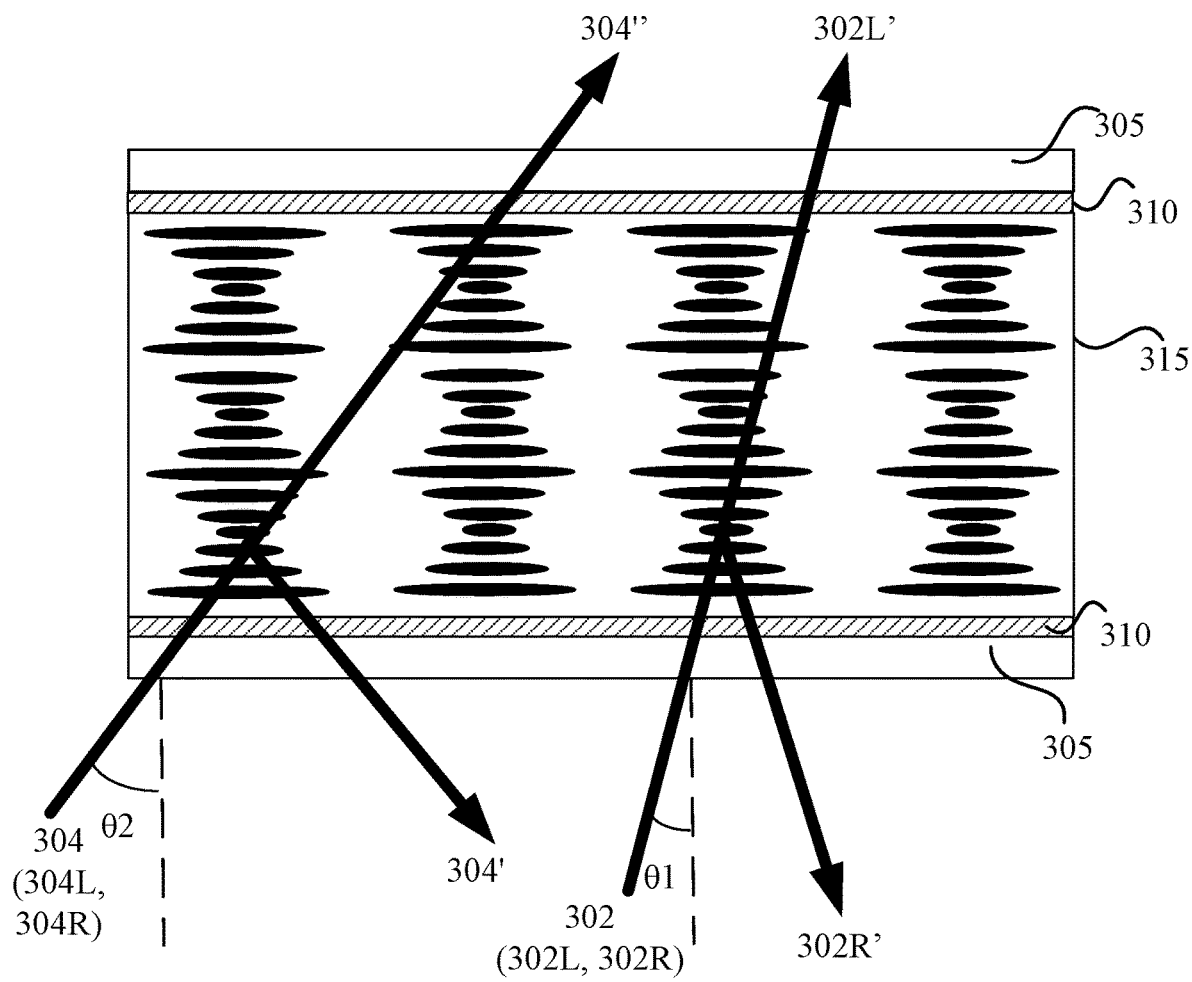
FIG. 3A illustrates a cross section of a CLC reflective polarizer, according to an embodiment of the present disclosure.

FIG. 3A illustrates a y-z cross section of a CLC reflective polarizer 300, according to an embodiment of the present disclosure. The CLC reflective polarizer 300 may be an embodiment of the circular reflective polarizer 108. As shown in FIG. 3A, the CLC reflective polarizer 300 may include two parallel substrates 305 (e.g., a first substrate and a second substrate) and a CLC layer 315 disposed between the two substrates 305. The axial or helical axis direction of CLCs in the CLC layer 315 is along the z-direction. At least one (e.g., each) of the substrates 305 may be provided with an alignment layer 310. The alignment layer 310 may be configured to provide an initial alignment of the CLCs in the CLC layer 315. In some embodiments, the two alignment layers 310 may provide anti-parallel homogeneous alignments to the CLCs. The substrates 305 may be substantially transparent in the visible band (about 380 nm to about 700 nm). In some embodiments, the substrates 305 may also be transparent in some or all of the infrared ("IR") band (about 700 nm to about 1 mm). Each of the substrates 305 may include a suitable material that is substantially transparent to lights in the above-listed wavelength range, e.g., glass, plastic, sapphire, etc. The substrates 305 may be rigid or flexible. In some embodiments, at least one (e.g., each) of the substrates 305 may be a part of another optical device or another optoelectrical device. For example, at least one (e.g., each) of the substrates 305 may be a part of a functional device, such as a display screen. For another example, at least one (e.g., each) of the substrates 305 may be a part of an optical lens assembly, such as the pancake lens assembly 100 shown in FIG. 1.

The CLC layer 315 may have a helical structure that includes a constant helix pitch distribution. The axis of the helix may be normal to the surface of the CLC layer 315. In some embodiments, the helix pitch may be of the same order as the wavelengths of visible lights, and the CLC layer 315 may have a reflection band in the visible spectrum. In some embodiments, the CLC reflective polarizer 300 may be a narrowband CLC reflective polarizer with a narrow reflection bandwidth (e.g., tens of nanometers). The CLC reflective polarizer 300 may be operated along with a narrowband light source (e.g., a 10-nm-bandwidth monochromatic light source). When the incidence wavelength is within the reflection band of the CLC reflective polarizer 300, a circularly polarized incident light with the same handedness as the helix structure of the CLC reflective polarizer 300 may be substantially (e.g., primarily) reflected, whereas a circularly polarized light with the opposite handedness may be substantially (e.g., primarily) transmitted.

For discussion purposes, the CLC reflective polarizer 300 shown in FIG. 3A may be a right-handed CLC ("RHCLC") refractive circular polarizer 300. Unpolarized lights 302 and 304 having wavelengths within the reflection band of the CLC reflective polarizer 300 may be incident onto the CLC reflective polarizer 300 at a small incidence angle $\theta_1$ (including zero incidence angle) and a large incidence angle $\theta_2$, respectively. The unpolarized light 302 may be decomposed into a right-handed circularly polarized ("RHCP") light 302R and a left-handed circularly polarized ("LHCP") light 302L. The propagating direction of the unpolarized light 302 may be aligned substantially parallel with the helical axis of the helical structure. Accordingly, the unpolarized light 302 may encounter a substantially circular cross section of the helixes of the CLCs in the RHCLC reflective polarizer 300. Thus, the LHCP light 302L may be substantially (e.g., primarily) transmitted (e.g., about 80% to about 100% transmitted) by the RHCLC refractive circular polarizer 300 as an LHCP light 302L', and the RHCP light 302R may be substantially (e.g., primarily) reflected (e.g., about 80% to about 100% reflected) by the RHCLC refractive circular polarizer 300 as an RHCP light 302R'.

The unpolarized light 304 may be decomposed into an RHCP light 304R and an LHCP light 304L. Due to the large incidence angle $\theta_2$, the unpolarized light 304 may encounter an elliptical cross section of the helixes of the CLCs in the RHCLC reflective polarizer 300. Thus, the LHCP light 304L and the RHCP light 304R may be distorted when propagating through the RHCLC refractive circular polarizer 300, which may reduce the transmittance of the LHCP light 304L and the reflectance of the RHCP light 304R. That is, the reflectance of the LHCP light 304L may be increased, and the transmittance of the RHCP light 304R may be increased.

Thus, a portion of the unpolarized light 304 may be reflected by the RHCLC reflective polarizer 300 as a reflected light 304', which may include a combination of an RHCP light and an LHCP light. Accordingly, the reflected light 304' may be elliptically polarized. Similarly, another portion of the unpolarized light 304 may be transmitted by the RHCLC reflective polarizer 300 as a transmitted light 304", which may include a combination of an RHCP light and an LHCP light. Accordingly, the transmitted light 304" may be elliptically polarized. These distortions at large incidence angles may reduce the polarization capability of the CLC reflective polarizer 300 and may result in a color shift. To make the CLC reflective polarizer 300 suitable for a broad range of angles of incidence ("AOI") instead of a narrow range or a specific AOI, in some embodiments, one or more compensation films may be paired with the CLC reflective polarizer 300 to provide a polarization compensation at large incidence angles.

Further, to broaden the reflection bandwidth of the CLC layer as well as the CLC reflective polarizer, e.g., to cover substantially the entire visible spectral range, in some embodiments, a high birefringence (e.g., Δn>0.6) CLC material may be included, provided that the helix pith is uniform. In some embodiments, the CLC reflective polarizer may include a plurality of CLC layers stacked together. The CLC layers may have narrow reflection bandwidths corresponding to narrowband light sources (e.g., 10-nm-bandwidth) emitting lights in different colors. The reflection bandwidths of the respective CLC layers may be superimposed, such that an overall reflection bandwidth of the CLC reflective polarizer may be broadened. An exemplary CLC reflective polarizer 320 will be explained with reference to FIG. 3B. In some embodiments, a variation of helix pitch (e.g., a pitch gradient) may be introduced to the CLCs to broaden the reflection bandwidth. An exemplary CLC reflective polarizer 340 will be explained with reference to FIG. 3C.

Figure 3B:
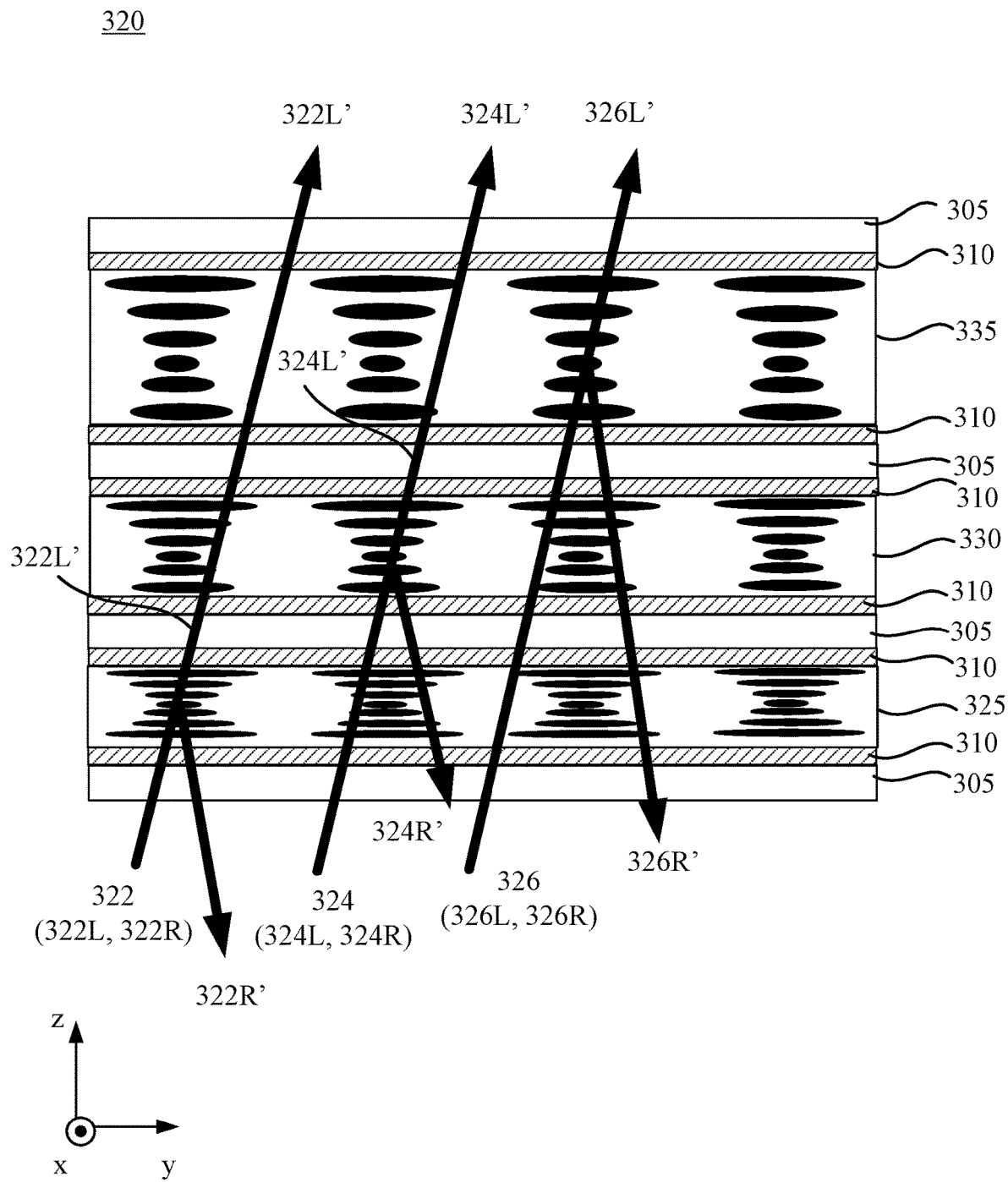
FIG. 3B illustrates a cross section of a CLC reflective polarizer, according to another embodiment of the present disclosure.

FIG. 3B illustrates a cross section of a CLC reflective polarizer 320, according to another embodiment of the present disclosure, and the CLC reflective polarizer 320 shown in FIG. 3B may include elements, structures, or functions that are the same as or similar to those of the CLC reflective polarizer 300 shown in FIG. 3A. Detailed descriptions of the same or similar elements, structures, or functions can refer to the above descriptions with respect to FIG. 3A. As shown in FIG. 3B, the CLC reflective polarizer 320 may include a plurality of CLC layers stacked together. Each of the CLC layers may have a helical structure with a constant helix pitch distribution. The helical pitches may spatially vary between layers. The CLC layers may have narrow reflection bandwidths corresponding to the bandwidths of narrowband light sources (e.g., 10-nm-bandwidth) emitting lights in different colors. In some embodiments, the reflection bands of the CLC layers may not overlap with each other. In some embodiments, the reflection bands of the CLC layers may slightly overlap with each other, such that an overall reflection band of the CLC reflective polarizer 320 may be continuous and broadened. Each CLC layer may be configured to substantially (e.g., primarily) reflect a circularly polarized incident light having a wavelength within the reflection band and having the same handedness as that of the helix structure of the CLC layer, and substantially (e.g., primarily) transmit a circularly polarized incident light having a wavelength within the reflection band and having the opposite handedness. Each CLC layer may transmit incident lights having wavelengths outside of the reflection band.

In addition, each CLC layer may be disposed between two parallel substrates 305. At least one (e.g., each) of the substrates 305 may be provide with an alignment layer 310 may be respectively disposed. In some embodiments, each CLC layer may be disposed between two substrates 305. In some embodiments, two adjacent CLC layers may share a same substrate disposed between the two adjacent CLC layers, as shown in FIG. 3B. For discussion purposes, FIG. 3B shows that the CLC reflective polarizer 320 may include three CLC layers 325, 330, and 335, each of which may have a helical structure that includes a respective constant helix pitch distribution. The helical pitches of the CLC layers 325, 330, and 335 may be different, e.g., gradually increase. The CLC layers 325, 330, and 335 may have narrow reflection bandwidths corresponding to those of a plurality of narrowband light sources (e.g., 10-nm-bandwidth) configured to emit lights in different colors. For example, the CLC layers 325, 330, and 335 may have a reflection band in the wavelength ranges of blue, green and red lights, respectively, and the CLC layers 325, 330 and 335 may be paired with narrowband blue, green and red light sources having a central wavelength of about 448 nm, 524 nm, and 638 nm, respectively.

For discussion purposes, the CLC reflective polarizer 320 shown in FIG. 3B may be a right-handed CLC ("RHCLC") refractive circular polarizer 320. Unpolarized lights 322, 324, and 364 may have wavelengths within the reflection bands of the CLC layers 325, 330, and 335, respectively. For example, the unpolarized lights 322, 324, and 364 may be blue, green, red lights, respectively. The unpolarized lights 322, 324, and 326 may be incident onto the CLC reflective polarizer 300 at a small incidence angle (including the zero-degree incidence angle). The incidence angles may or may not be the same. The unpolarized light (e.g., blue light) 322 may be decomposed into an RHCP light 322R and an LHCP light 322L. Because the wavelength of the unpolarized light (e.g., blue light) 322 falls within the reflection band of the CLC layer 325, the LHCP light 322L may be substantially (e.g., primarily) transmitted (e.g., about 80% to about 100% transmitted) by the CLC layer 325 as an LHCP light 322L', and the RHCP light 322R may be substantially (e.g., primarily) reflected (e.g., about 80% to about 100% reflected) by the CLC layer 325 as an RHCP light 322R'. Because the wavelength of the LHCP light 322L' is not within the reflection bands of the CLC layers 330 and 335, the LHCP light 322L' may be transmitted through the CLC layers 325 and 330.

The unpolarized light (e.g., green light) 324 may be decomposed into an RHCP light 324R and an LHCP light 324L. Because the wavelength of the unpolarized light (e.g., green light) 324 is not within the reflection band of the CLC layer 325, the unpolarized light (e.g., green light) 324 may be transmitted through the CLC layer 325. Because the wavelength of the unpolarized light (e.g., green light) 324 falls within the reflection band of the CLC layer 330, the LHCP light 324L may be substantially (e.g., primarily) transmitted (e.g., about 80% to about 100% transmitted) by the CLC layer 330 as an LHCP light 324L', and the RHCP light 324R may be substantially (e.g., primarily) reflected (e.g., about 80% to about 100% reflected) by the CLC layer 330 as a RHCP light 324R'. Because the wavelength of the LHCP light 324L' is not within the reflection bands of the CLC layer 335, the LHCP light 324L' may be transmitted through the CLC layer 335. Because the wavelength of the RHCP light 324R' is not within the reflection bands of the CLC layer 325, the RHCP light 324R' may be transmitted through the CLC layer 325.

The unpolarized light (e.g., red light) 326 may be decomposed into an RHCP light 326R and an LHCP light 326L. Because the wavelength of the unpolarized light (e.g., red light) 326 is not within the reflection bands of the CLC layer 325 and 330, the unpolarized light (e.g., red light) 326 may be substantially (e.g., primarily) transmitted through the CLC layers 325 and 330. Then the LHCP light 326L may be substantially (e.g., primarily) transmitted (e.g., about 80% to about 100% transmitted) by the CLC layer 335 as an LHCP light 326L', and the RHCP light 326R may be substantially (e.g., primarily) reflected (e.g., about 80% to about 100% reflected) by the CLC layer 335 as an RHCP light 326R'. Because the wavelength of the RHCP light 326R' is not within the reflection bands of the CLC layers 330 and 325, the RHCP light 326R' may be transmitted through the CLC layers 330 and 325.

Figure 3C:
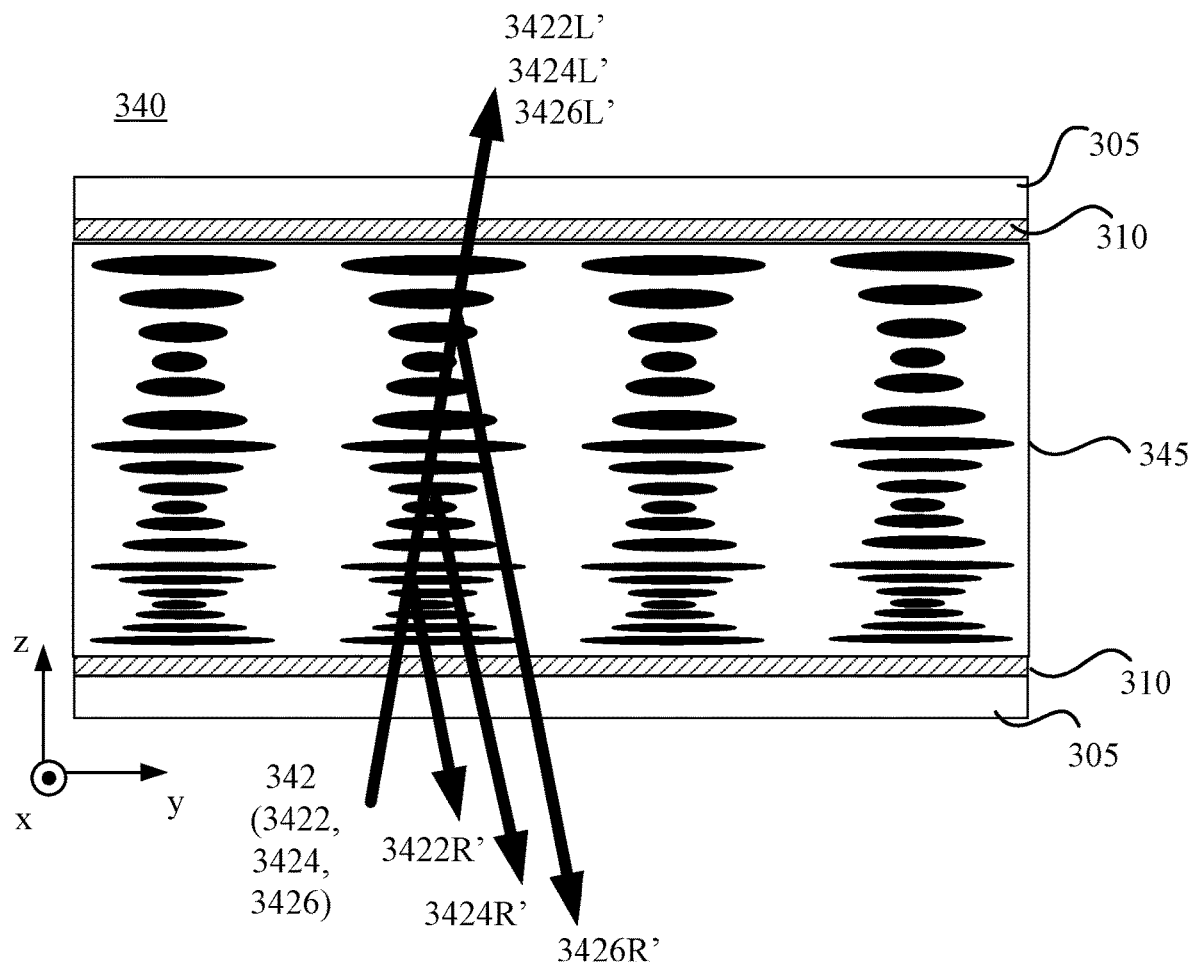
FIG. 3C illustrates a cross section of a CLC reflective polarizer, according to another embodiment of the present disclosure.

FIG. 3C illustrates a cross section of a CLC reflective polarizer 340, according to another embodiment of the present disclosure. The CLC reflective polarizer 340 may include elements, structures, or functions that are the same as or similar to those included in the reflective polarizer 300 shown in FIG. 3A or the reflective polarizer 320 shown in FIG. 3B. Detailed descriptions of the same or similar elements, structures, or functions can refer to the above descriptions with respect to FIG. 3A or FIG. 3B. As shown in FIG. 3C, the CLC reflective polarizer 340 may include two parallel substrates 305 and a CLC layer 345 disposed between the two substrates 305. At least one (e.g., each) of the substrates 305 may be provided with an alignment layer 310, which may provide an initial alignment for the CLCs in the CLC layer 345. The CLC layer 345 may have a helical structure that includes a spatially varying helix pitch distribution, e.g., the helix pitch may gradually increase along the +z-axis direction (or the thickness direction). The reflection band of the CLC layer 345 may cover a broad band. The lights having a spectrum in the covered broad band and the same handedness as that of the helical structures of the CLC reflective polarizer 340 may be substantially (e.g., primarily) reflected by the CLC reflective polarizer 340. The CLC reflective polarizer 340 may be referred to as a broadband CLC reflective polarizer 340. In some embodiments, the CLC reflective polarizer 340 may be paired with a broadband polychromatic light source, such as a 300-nm-bandwidth light source covering the visible wavelength range.

For discussion purposes, the CLC reflective polarizer 340 may be a right-handed CLC ("RHCLC") refractive circular polarizer 340 having a 300-nm-bandwidth reflection band covering the visible wavelength range. A broadband unpolarized light 342 may be incident onto a shorter pitch side (e.g., the side where the helical pitch is shorter) of the CLC reflective polarizer 340 at a substantially small incidence angle (including a zero-degree incidence angle). For discussion purposes, the broadband unpolarized light 342 may be decomposed into an unpolarized blue light 3422, an unpolarized green light 3424, and an unpolarized red light 3426 having a central wavelength of about 448 nm, about 524 nm, and about 638 nm, respectively. Each of the unpolarized blue light 3422, the unpolarized green light 3424, and the unpolarized red light 3426 may be decomposed into an RHCP light (or component) and an LHCP light (or component). As the unpolarized blue light 3422 propagates substantially along the axial direction of the CLC layer 345, the RHCP component of the unpolarized blue light 3422, the unpolarized green light 3424, and the unpolarized red light 3426 may be substantially (e.g., primarily) reflected (e.g., about 80% to about 100% reflected) by the CLC layer 345 as an RHCP blue light 3422R', an RHCP green light 3424R', and an RHCP red light 3426R', respectively. The LHCP component of the unpolarized blue light 3422, the unpolarized green light 3424, and the unpolarized red light 3426 may be substantially (e.g., primarily) transmitted (e.g., about 80% to about 100% transmitted) by the CLC layer 345 as an LHCP blue light 3422L', an LHCP green light 3424L' and an LHCP red light 3426L', respectively.

In some embodiments, the broadband CLC reflective polarizer 340 (e.g., the CLC layer 345 with a gradient pitch) may be fabricated based on CLC and/or polymer composites. CLCs may be mixed with mono-functional chiral monomers, multi-functional monomers, and/or a photo-initiator. The mixture may be filled into a cell formed by two parallel substrates and the mixture may be disposed between the two substrates. The cell may be irradiated by, e.g., a UV light, and the monomers may be polymerized. During the polymerization, a UV intensity gradient may be generated across the cell in the thickness direction, which in turn produces a free radical density gradient. When the chiral monomers diffuse to the high free radical density region, the chiral monomers may be polymerized there. Thus, the formed chiral polymer density may vary across the cell, which induces a variation of the helix pitch of the CLCs. The helical structure with a pitch gradient may be stabilized by the crosslinked multi-functional monomers after the polymerization.

Figure 4:
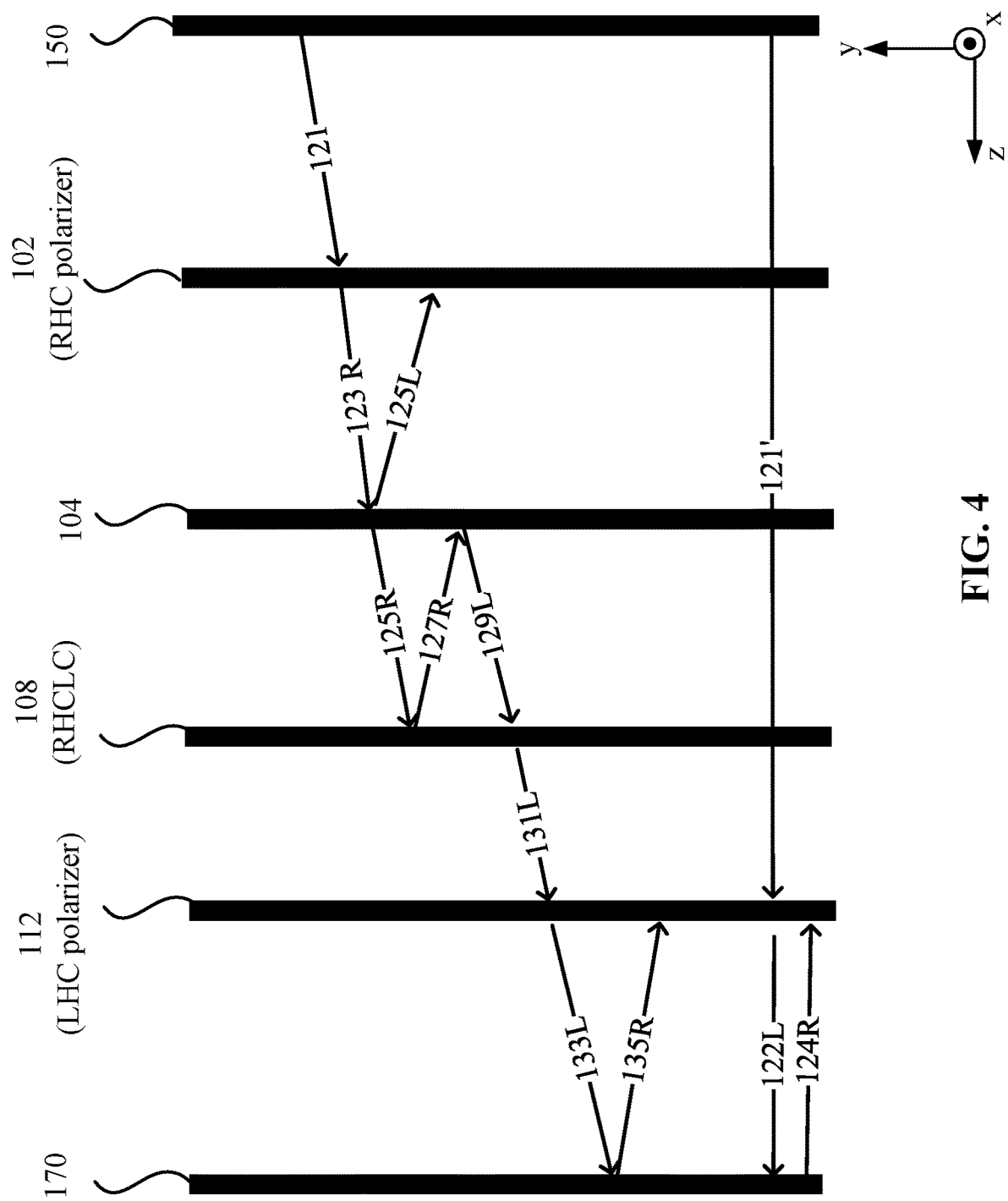
FIG. 4 illustrates a schematic optical path of the pancake lens assembly shown in FIG. 1, according to an embodiment of the present disclosure.

FIG. 4 illustrates a schematic optical path of the pancake lens assembly 100 shown in FIG. 1, according to an embodiment of the present disclosure. For the simplicity of illustration, the first optical element 105 and the second optical element 110 are omitted in FIG. 4. In FIG. 4, letter "R" following a number denotes a right-handed circularly polarized ("RHCP") light, and letter "L" following a number denotes a left-handed circularly polarized ("LHCP") light. For discussion purposes, as shown in FIG. 4, the electronic display 150 may generate an unpolarized image light 121. The first circular absorptive polarizer 102 and the second circular absorptive polarizer 112 may be a right-handed circular absorptive polarizer ("RHC polarizer") and a left-handed circular absorptive polarizer ("LHC polarizer"), respectively. The circular reflective polarizer 108 may be a right-handed CLC ("RHCLC") reflective polarizer. For illustrative purposes, the electronic display 150, the first circular absorptive polarizer 102, the circular reflective polarizer 108, and the second circular absorptive polarizer 112 are drawn as having flat surfaces. In some embodiments, one or more of the electronic display 150, the first circular absorptive polarizer 102, the circular reflective polarizer 108, and the second circular absorptive polarizer 112 may have curved surfaces.

The unpolarized image light 121 may be transmitted by the first circular absorptive polarizer 102 (e.g., a right-handed circular absorptive polarizer) as an RHCP light 123R towards the mirror 104. A first portion of the RHCP light 123R may be reflected by the mirror 104 as an LHCP light 125L propagating towards the first circular absorptive polarizer 102. A second portion of the RHCP light 123R may be transmitted by the mirror 104 as an RHCP light 125R propagating toward the circular reflective polarizer 108 (e.g., an RHCLC reflective polarizer). The LHCP light 125L may be blocked (e.g., absorbed) by the first circular absorptive polarizer 102 (e.g., a right-handed circular absorptive polarizer) from propagating towards the electronic display 150. The RHCLC reflective polarizer 108 may substantially (e.g., primarily) reflect an RHCP light and transmit an LHCP light. Thus, the RHCP light 125R propagating in the +z-direction may be substantially (e.g., primarily) reflected by the RHCLC reflective polarizer 108 as an RHCP light 127R propagating in the −z-direction, which may be further reflect by the mirror 104 as an LHCP light 129L. The LHCP light 129L may be substantially (e.g., primarily) transmitted by the RHCLC reflective polarizer 108 as an LHCP light 131L toward the second circular absorptive polarizer 112 (e.g., a left-handed circular absorptive polarizer). The LHCP light 131L may be transmitted by the second circular absorptive polarizer 112 as an LHCP light 133L that may be delivered to the eye 170.

The second circular absorptive polarizer 112 (e.g., a left-handed circular absorptive polarizer) may be configured to reduce the intensity of an undesirable ghost image caused by an image light 121' directly received from the electronic display 150. The image light 121' may be an unpolarized light. The second circular absorptive polarizer 112 (e.g., a left-handed circular absorptive polarizer) may transmit the left-handed circularly polarized component of the image light 121' as an LHCP light 122L, and absorb the right-handed circularly polarized component of the image light 121', thereby reducing the intensity of an undesirable ghost image caused by the image light 121'. In some embodiments, the second circular absorptive polarizer 112 (e.g., a left-handed circular absorptive polarizer) may also function as an anti-narcissus film. For example, the LHCP light 133L and the LHCP light 122L may be reflected by the eye 170 as an RHCP light 135R and an RHCP light 124R each propagating in the −z-direction. Because the second circular absorptive polarizer 112 (e.g., a left-handed circular absorptive polarizer) transmits an LHCP light and blocks an RHCP light, both of the RHCP light 135R and the RHCP light 124R may be blocked (e.g., absorbed) by the second circular absorptive polarizer 112 (e.g., a left-handed circular absorptive polarizer). Thus, narcissus may be suppressed, and the user may not observe the image of the eye 170.

For illustrative purposes, FIG. 4 shows that each of the image light 121 and 121' emitted from the electronic display 150 is an unpolarized light. In some embodiments, when the light emitted from the electronic display 150 is an RHCP light, the first circular absorptive polarizer 102 may be omitted. In some embodiments, the light emitted from the electronic display 150 may be a linearly polarized light, and a quarter-wave plate ("QWP") may be arranged between the electronic display 150 and the mirror 104 to convert the linearly polarized light to a circularly polarized light, e.g., an RHCP light.

Figure 5A:
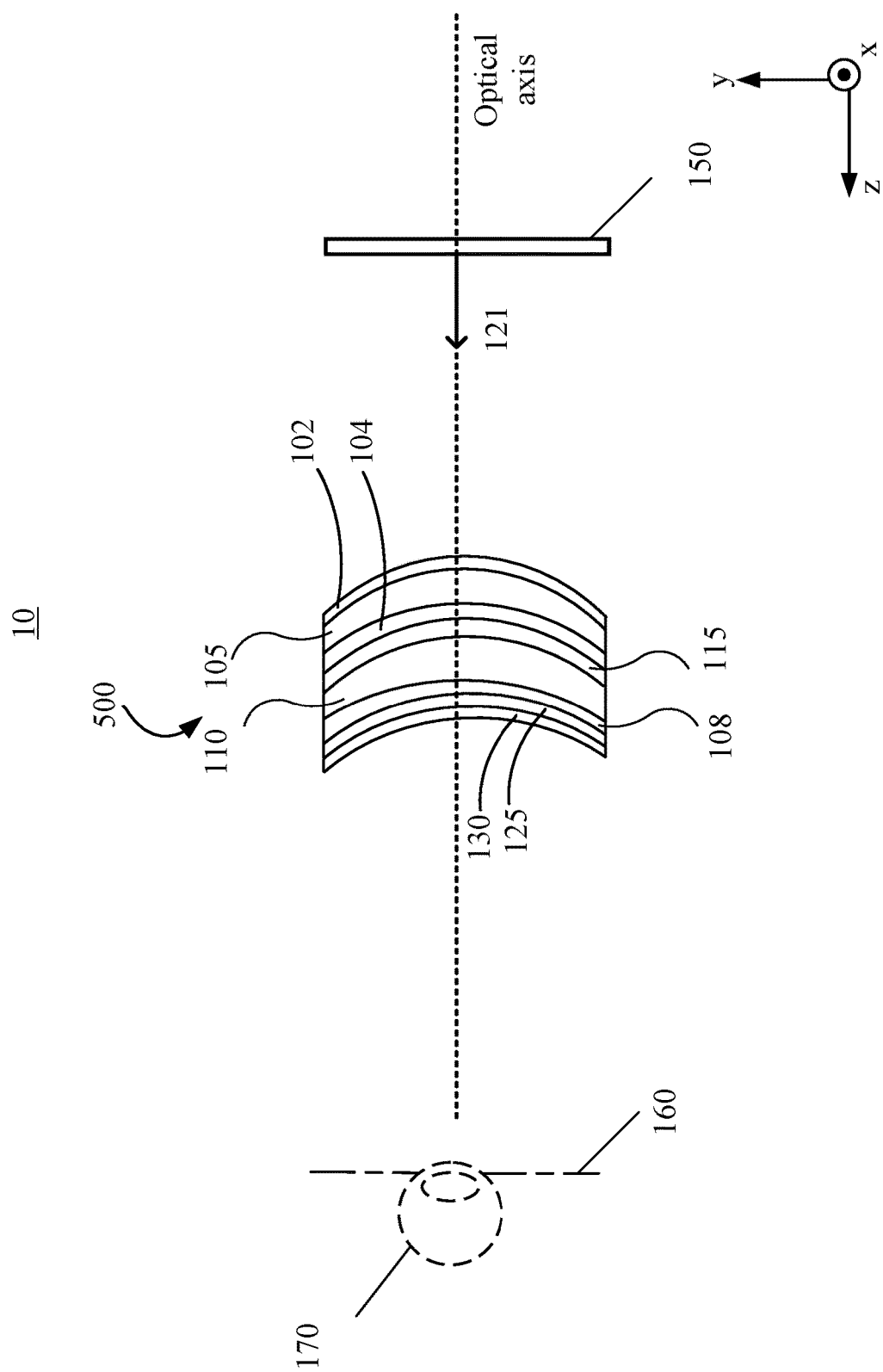
FIG. 5A illustrates a schematic diagram of an optical including a pancake lens assembly, according to another embodiment of the present disclosure.

In some embodiments, the second circular absorptive polarizer 112 may be replaced by a combination of a QWP and a linear polarizer. FIG. 5A illustrates a schematic diagram of a pancake lens assembly 500, which may be included in the system 10, according to another embodiment of the present disclosure. The pancake lens assembly 500 may include elements, structures, or functions that are the same as or similar to those of the pancake lens assembly 100 shown in FIG. 1. Detailed descriptions of the same or similar elements, structures, or functions can refer to the above descriptions with respect to FIG. 1. As shown in FIG. 5A, a QWP 125 and a linear polarizer 130 (which may be an absorptive linear polarizer) may be arranged in an optical series and disposed at the second surface of the second optical element 110. For example, the QWP 125 may be disposed between the linear polarizer 130 and the first circular reflective polarizer 108 at the second surface of the second optical element 110. Each of the QWP 125 and the linear polarizer 130 may be a film or coating disposed at (e.g., bonded to or formed on) the second surface of the second optical element 110. In some embodiments, the QWP 125 and the linear polarizer 130 may be disposed at the first surface of the second optical element 110.

The QWP 125 may be configured to transmit an image light received from the circular reflective polarizer 108 toward the linear polarizer 130. The linear polarizer 130 may be disposed between the QWP 125 and the eye 170. A polarization axis of the QWP 125 may be oriented relative to the transmission axis of the linear polarizer 130 to convert a linearly polarized light to a circularly polarized light or vice versa for a visible spectrum and/or infrared spectrum. In some embodiments, for an achromatic design, the QWP 125 may include a multi-layer birefringent material (e.g., polymer or liquid crystals) to produce a quarter wave birefringence across a wide spectral range. In some embodiments, for a monochrome design, an angle between the polarization axis (e.g., fast axis) of the QWP 125 and the transmission axis of the linear polarizer 130 may be approximately 45 degrees.

Figure 5B:
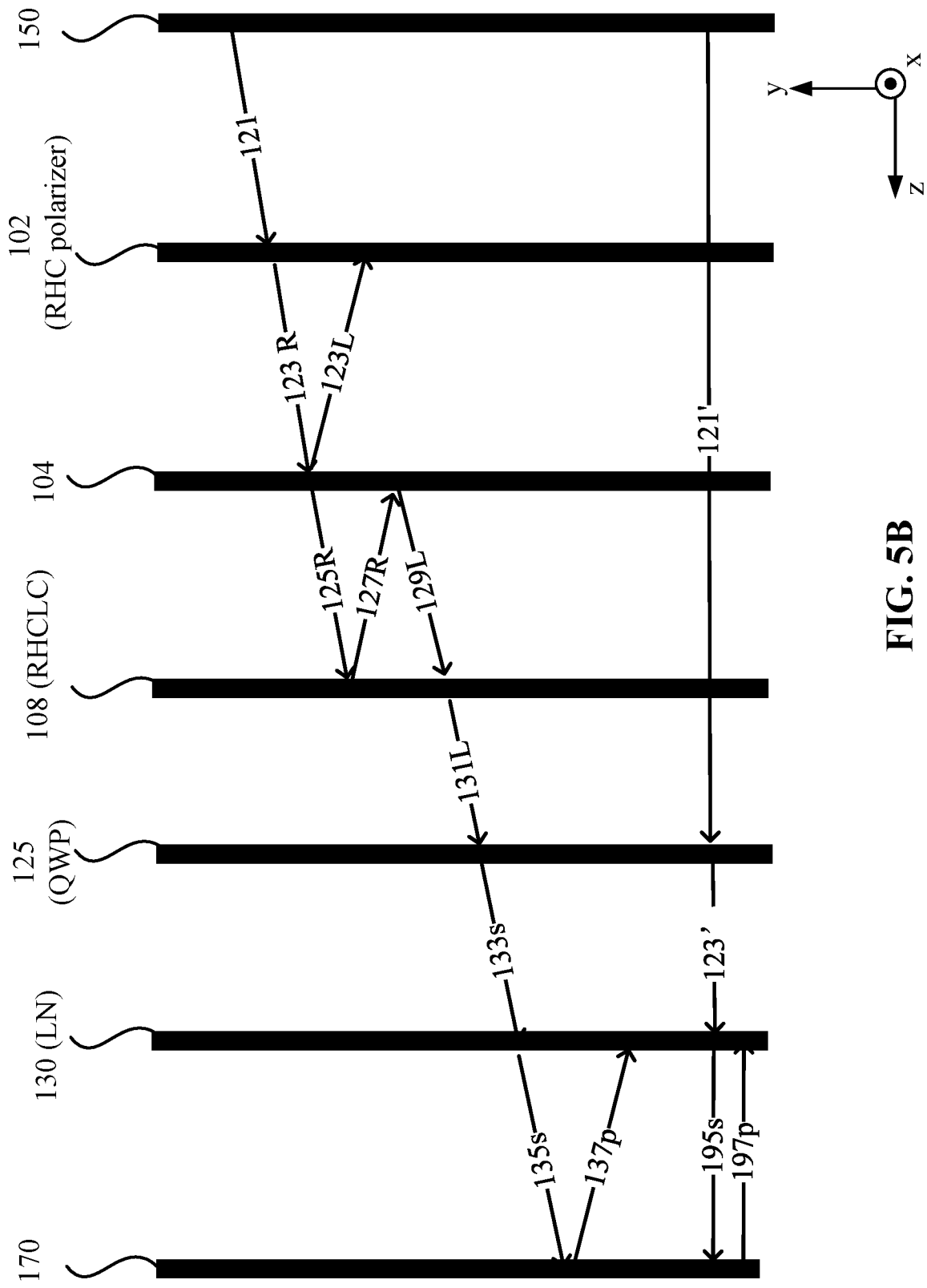
FIG. 5B illustrates a schematic optical path of the pancake lens assembly shown in FIG. 5A, according to an embodiment of the present disclosure.

FIG. 5B illustrates a schematic optical path of the pancake lens assembly 500 in FIG. 5A, according to an embodiment of the present disclosure. For the simplicity of illustration, the first optical element 105 and the second optical element 110 are omitted. As shown in FIG. 5B, the optical path of the image light 121 from the electronic display 150 to the QWP 125 may have components that are similar to those included in the optical path of the image light 121 from the electronic display 150 to the second circular absorptive polarizer 112 in FIG. 4. The optical path components that are the same as or similar to those shown in FIG. 4 are not repeated. The difference between the optical paths shown in FIG. 5B and FIG. 4 is that, in FIG. 5B the LHCP light 131L may be converted to an s-polarized light 133$s$ by the QWP 125 (note the letter "s" following a number denotes s-polarization). The linear polarizer 130 arranged between the QWP 125 and the eye 170 may be configured to transmit an s-polarized light and block a p-polarized light. Thus, the s-polarized light 133$s$ may be transmitted by the linear polarizer 130 as an s-polarized light 135$s$, which may be focused to the eye 170. The unpolarized image light 121' incident onto the QWP 125, which is directly received from the electronic display 150, may be transmitted as an unpolarized light 123' toward the linear polarizer 130. The s-polarized component of the unpolarized light 123' may be transmitted by the linear polarizer 130 as an s-polarized light 125's, and the p-polarized component of the unpolarized light 123' may be blocked (e.g., absorbed) by the linear polarizer 130, thereby reducing the intensity of an undesirable ghost image caused by the image light 121' directly received from the electronic display 150.

The combination of the QWP 125 and the linear polarizer 130 may also function as an anti-narcissus film. For example, as shown in FIG. 5B, the s-polarized light 135$s$ and the s-polarized light 125's may be reflected by the eye 170 as a p-polarized light 137$p$ and a p-polarized light 197$p$ propagating in the −z-direction, respectively. Because the linear polarizer 130 transmits an s-polarized light and blocks a p-polarized light, both of the p-polarized light 137$p$ and the p-polarized light 197$p$ may be blocked (e.g., absorbed) by the linear polarizer 130. Accordingly, the narcissus may be suppressed, and the user may not observe the image of the eye 170.

Figure 6A:
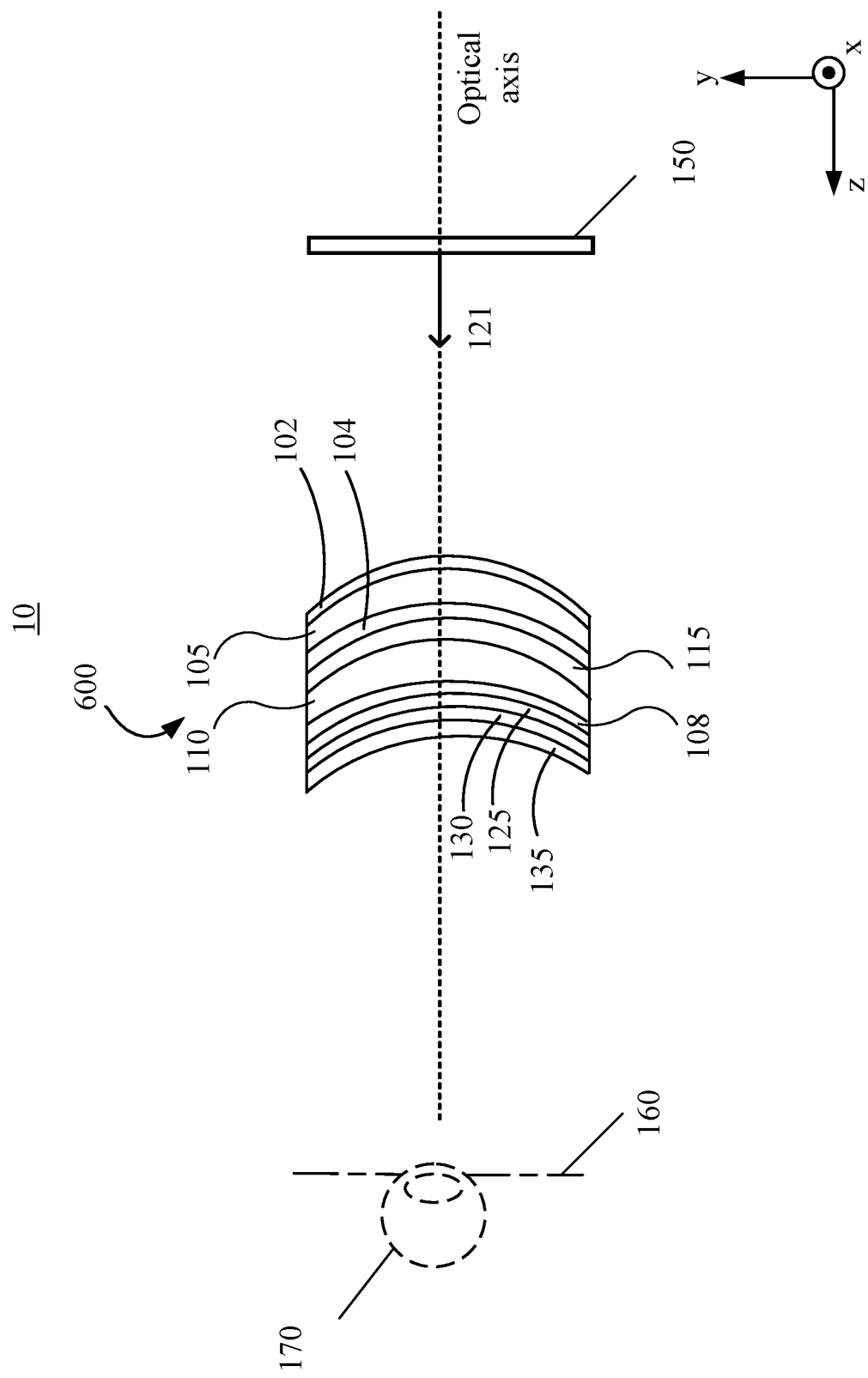
FIG. 6A illustrates a schematic diagram of a pancake lens assembly, according to another embodiment of the present disclosure.

In some embodiments, the QWP 125 may be a first QWP, and the pancake lens assembly 500 may further include a second QWP disposed between the linear polarizer 130 and the eye 170 to further suppress the narcissus. FIG. 6A illustrates a schematic diagram of a pancake lens assembly 600, which may be included in the system 10, according to another embodiment of the present disclosure. The pancake lens assembly 600 may include elements, structures, or functions that are the same as or similar to those of the pancake lens assembly 500 shown in FIG. 5A. Descriptions of the same or similar elements, structures, or functions may refer to the descriptions rendered above with respect to FIG. 5A. As shown in FIG. 6A, the pancake lens assembly 600 may include the QWP 125 (e.g., a first QWP), the linear polarizer 130, and a second QWP 135, each of which may be a film or coating disposed at (e.g., bonded to or formed on) the second surface of the second optical element 110. In some embodiments, the first QWP 125, the linear polarizer 130, and the second QWP 135 may be disposed at (e.g., bonded to or formed on) the first surface of the second optical element 110.

The first QWP 125 may be configured to transmit an image light output from the circular reflective polarizer 108 toward the linear polarizer 130. A polarization axis of the first QWP 125 may be oriented relative to the transmission axis of the linear polarizer 130 to convert a linearly polarized light into a circularly polarized light or vice versa for a visible spectrum and/or infrared spectrum. The second QWP 135 may be configured to transmit an image light output from the linear polarizer 130 toward the eye 170. A polarization axis of the second QWP 135 may be oriented relative to the transmission axis of the linear polarizer 130 to convert a linearly polarized light into a circularly polarized light or vice versa for a visible spectrum and/or infrared spectrum.

Figure 6B:
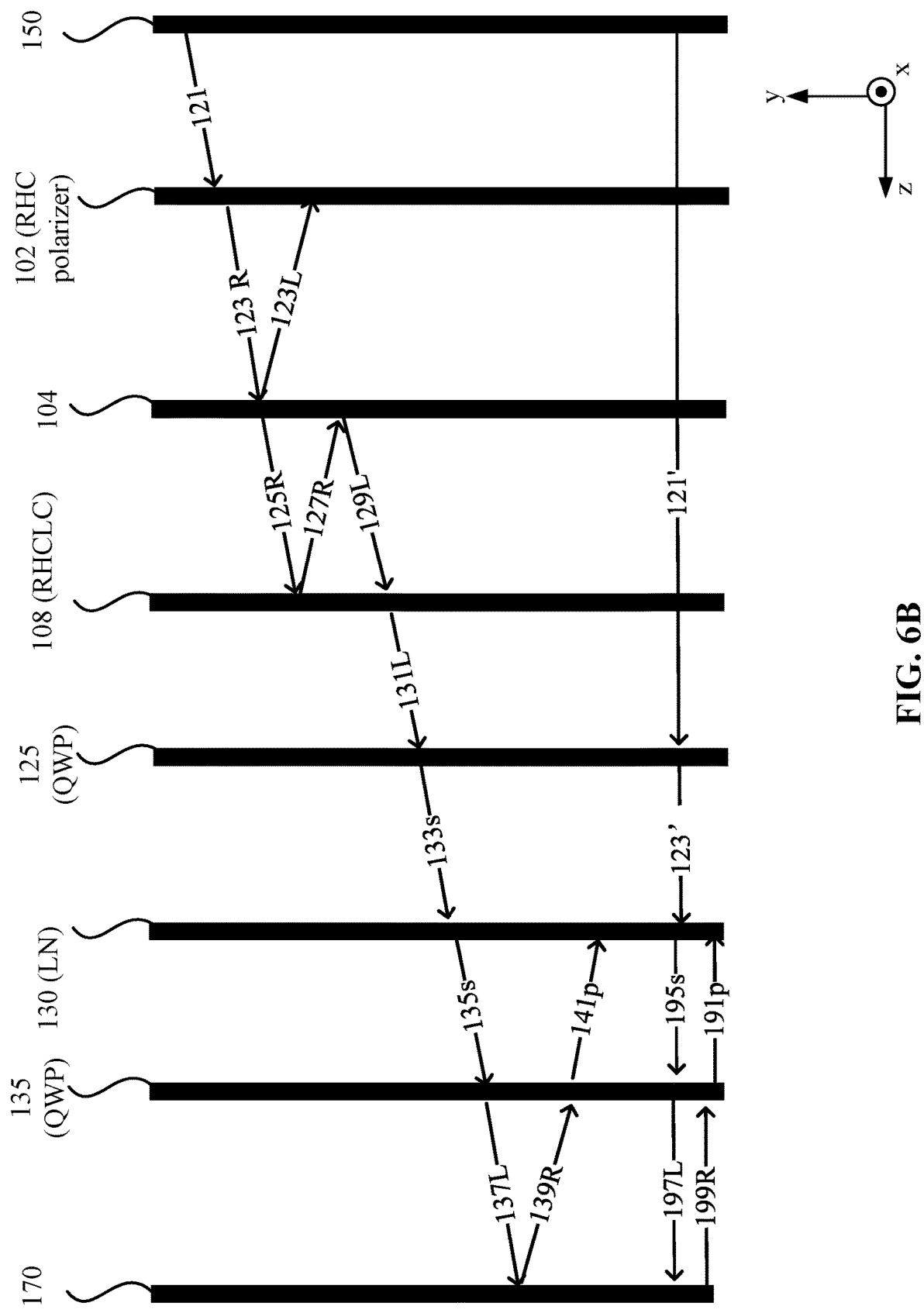
FIG. 6B illustrates a schematic optical path of the pancake lens assembly shown in FIG. 6A, according to an embodiment of the present disclosure.

FIG. 6B illustrates a schematic optical path of the pancake lens assembly 600 shown in FIG. 6A, according to an embodiment of the present disclosure. The similarities between the optical paths shown in FIG. 6B and FIG. 5B are not repeated. As shown in FIG. 6B and FIG. 5B, the optical path of the image light 121 from the electronic display 150 to the linear polarizer 130 may be similar, e.g., the light output from the linear polarizer 130 may be an s-polarized light 135s. The difference between the optical paths shown in FIG. 6B and FIG. 5B is that, in FIG. 6B the second QWP 135 may convert the s-polarized light 135s output from the linear polarizer 130 into an LHCP light 137L, which may be focused to the eye 170. In addition, the unpolarized image light 121' incident onto the first QWP 125, which is directly received from the electronic display 150, may be transmitted as an unpolarized light 123' toward the linear polarizer 130. The s-polarized component of the unpolarized light 123' may be transmitted by the linear polarizer 130 as an s-polarized light 195s, which is converted to an LHCP light 197L by the second QWP 135, and the p-polarized component of the unpolarized light 123' may be blocked (e.g., absorbed) by the linear polarizer 130, thereby reducing the intensity of an undesirable ghost image caused by the image light 121' directly received from the electronic display 150.

The combination of the first QWP 125, the linear polarizer 130, and the second QWP 135 may function as an enhanced anti-narcissus film. For example, as shown in FIG. 6B, the LHCP light 137L and the LHCP light 197L may be reflected by the eye 170 as an RHCP light 139R and an RHCP light 199R propagating in the −z-direction, respectively. The RHCP light 139R and the RHCP light 199R may be converted into a p-polarized light 141p and a p-polarized light 191p by the second QWP 135, respectively. Because the linear polarizer 130 transmits an s-polarized light and blocks a p-polarized light, both the p-polarized light 141p and the p-polarized light 191p may be blocked (e.g., absorbed) by the linear polarizer 130. Accordingly, the narcissus may be suppressed, and the user may not observe the image of the eye 170.

Figure 7A:
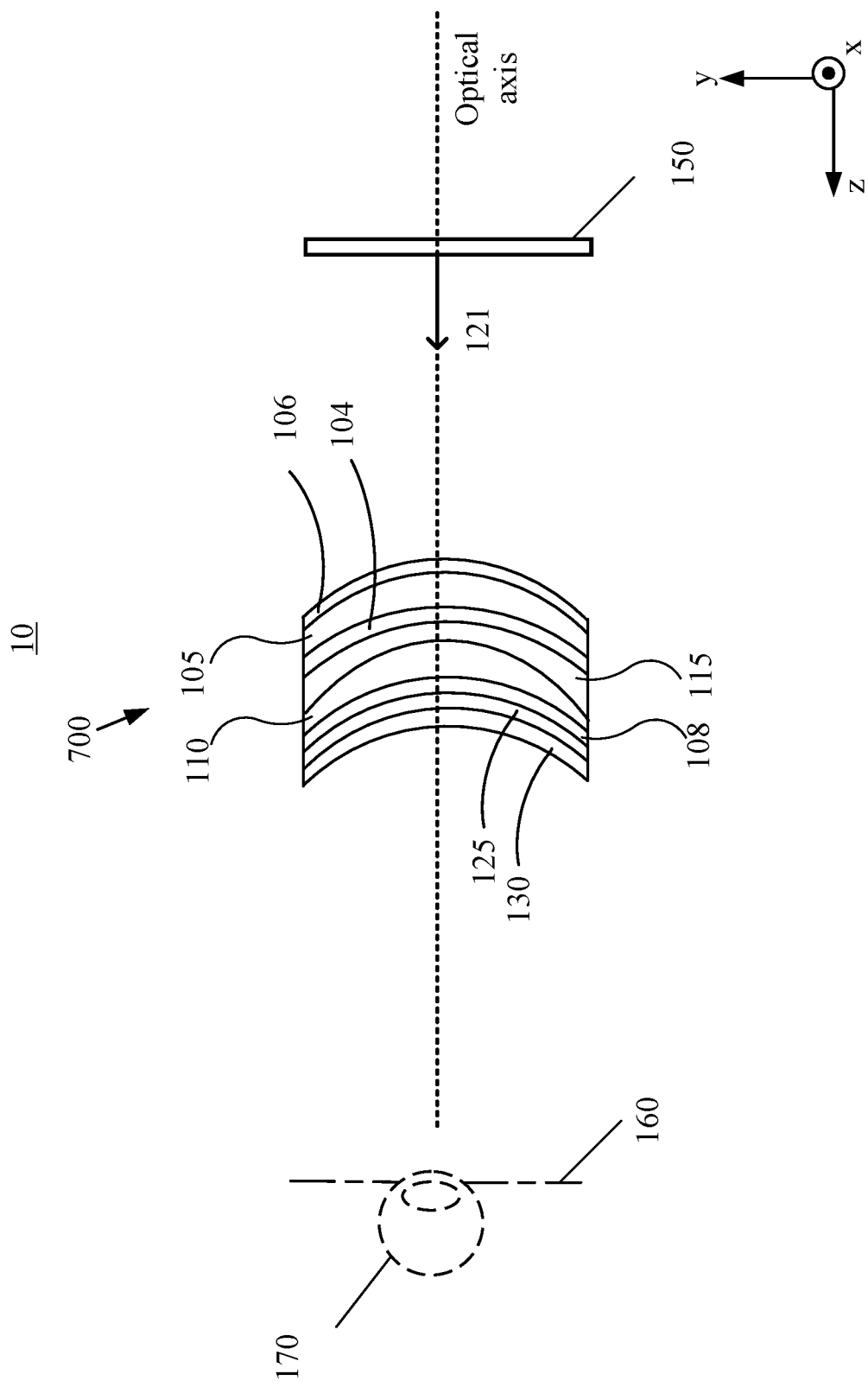
FIG. 7A illustrates a schematic diagram of an optical system including a pancake lens assembly, according to another embodiment of the present disclosure.

In some embodiments, the CLC reflective polarizer 108 that is arranged between the first QWP 125 and the mirror 104 may be a first CLC reflective polarizer. The pancake lens assembly 600 may further include a second CLC reflective polarizer disposed between the electronic display 150 and the mirror 104 to enhance the light transmittance of the pancake lens assembly 600, thereby increasing the light efficiency of an optical assembly or system including the pancake lens assembly 600 and the electronic display 150. Exemplary structures are shown in FIG. 7A, FIG. 7C, and FIG. 7D. FIG. 7A illustrates a schematic diagram of a pancake lens assembly 700, which may be included in the system 10, according to another embodiment of the present disclosure. The pancake lens assembly 700 shown in FIG. 7A may include elements, structures, or functions that are the same as or similar to those of the pancake lens assembly 500 shown in FIG. 5A, or the pancake lens assembly 600 shown in FIG. 6A. Descriptions of the same or similar elements, structures, or functions may refer to the above descriptions with respect to FIG. 5A and FIG. 6A.

As shown in FIG. 7A, the first CLC reflective polarizer 108 may be disposed at the second surface of the second optical element 110. A second CLC reflective polarizer 106 may be disposed at the first surface of the first optical element 105. The second CLC reflective polarizer 106 may be arranged between the mirror 104 and the electronic display 150. The second CLC reflective polarizer 106 may be a film or coating disposed at (e.g., bonded to or formed on) the first surface of the first optical element 105. In some embodiments, the second CLC reflective polarizer 106 may be disposed at the second surface of the first optical element 105, between the mirror 104 and the first optical element 105. In some embodiments, the helical structures of the first CLC reflective polarizer 108 and the second CLC reflective polarizer 106 may be configured with opposite handednesses.

Figure 7B:
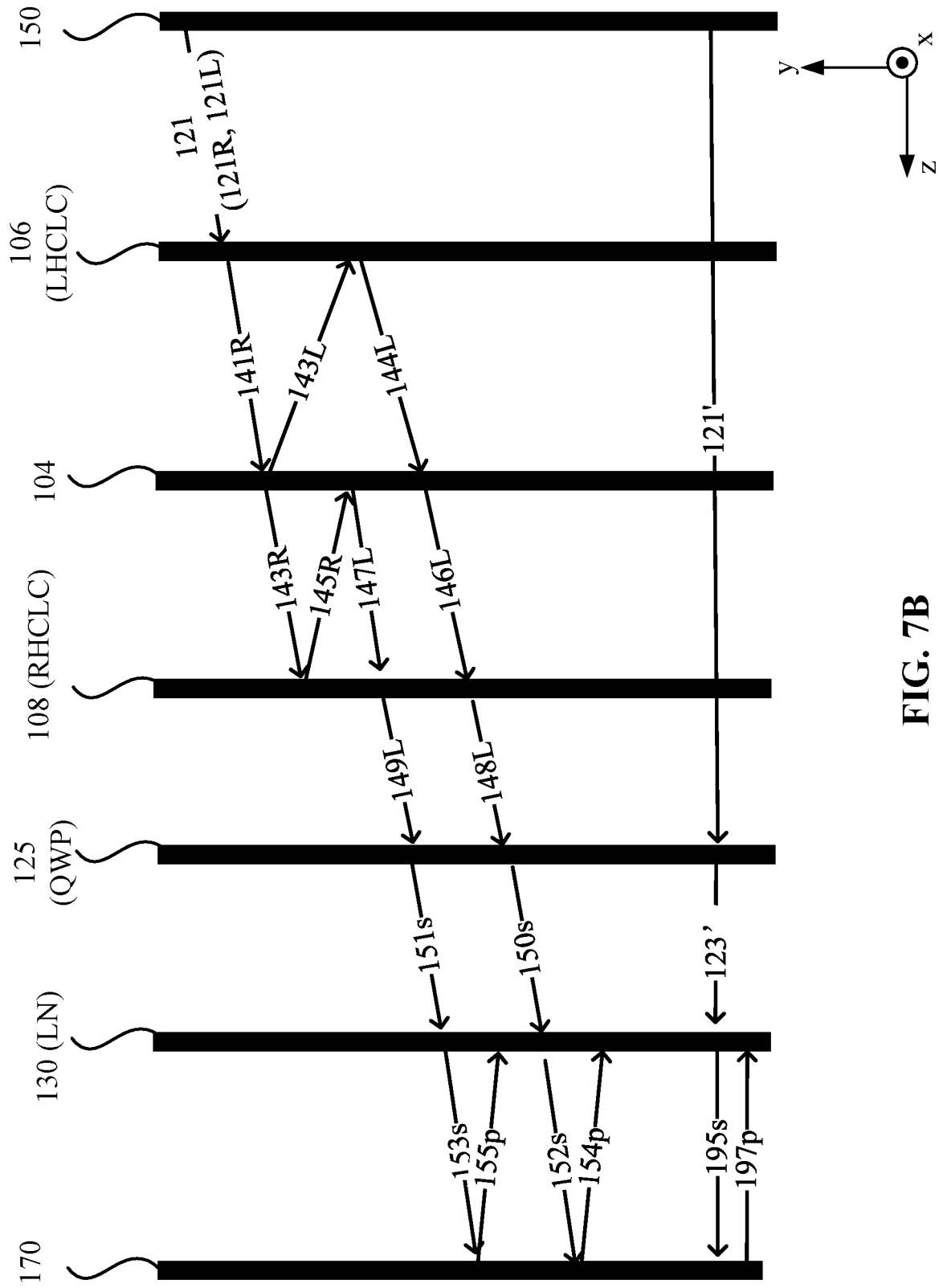
FIG. 7B illustrates a schematic optical path of the pancake lens assembly shown in FIG. 7A, according to an embodiment of the present disclosure.
Figure 7C:
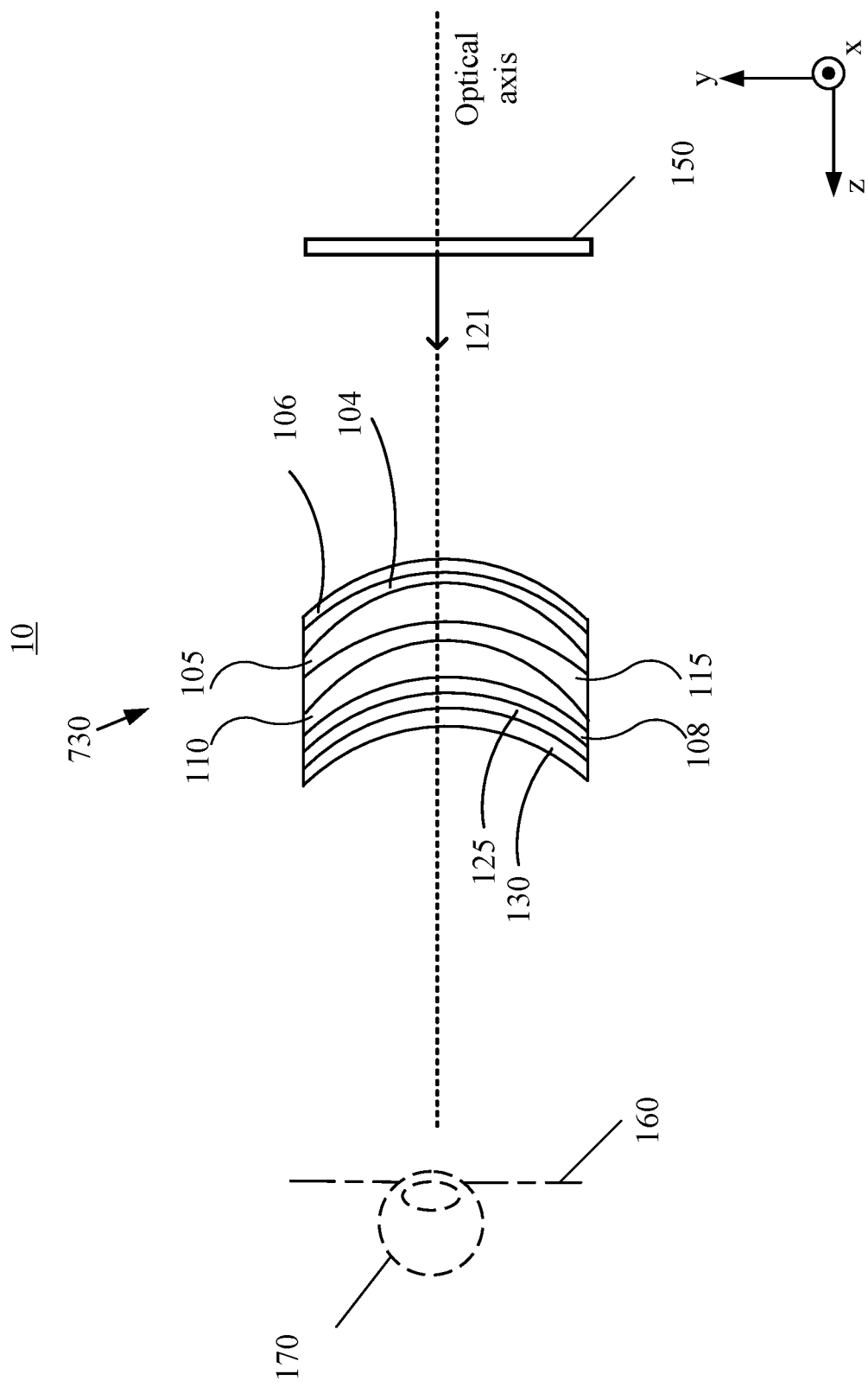
FIG. 7C illustrates a schematic diagram of an optical system including a pancake lens assembly, according to another embodiment of the present disclosure.
Figure 7D:
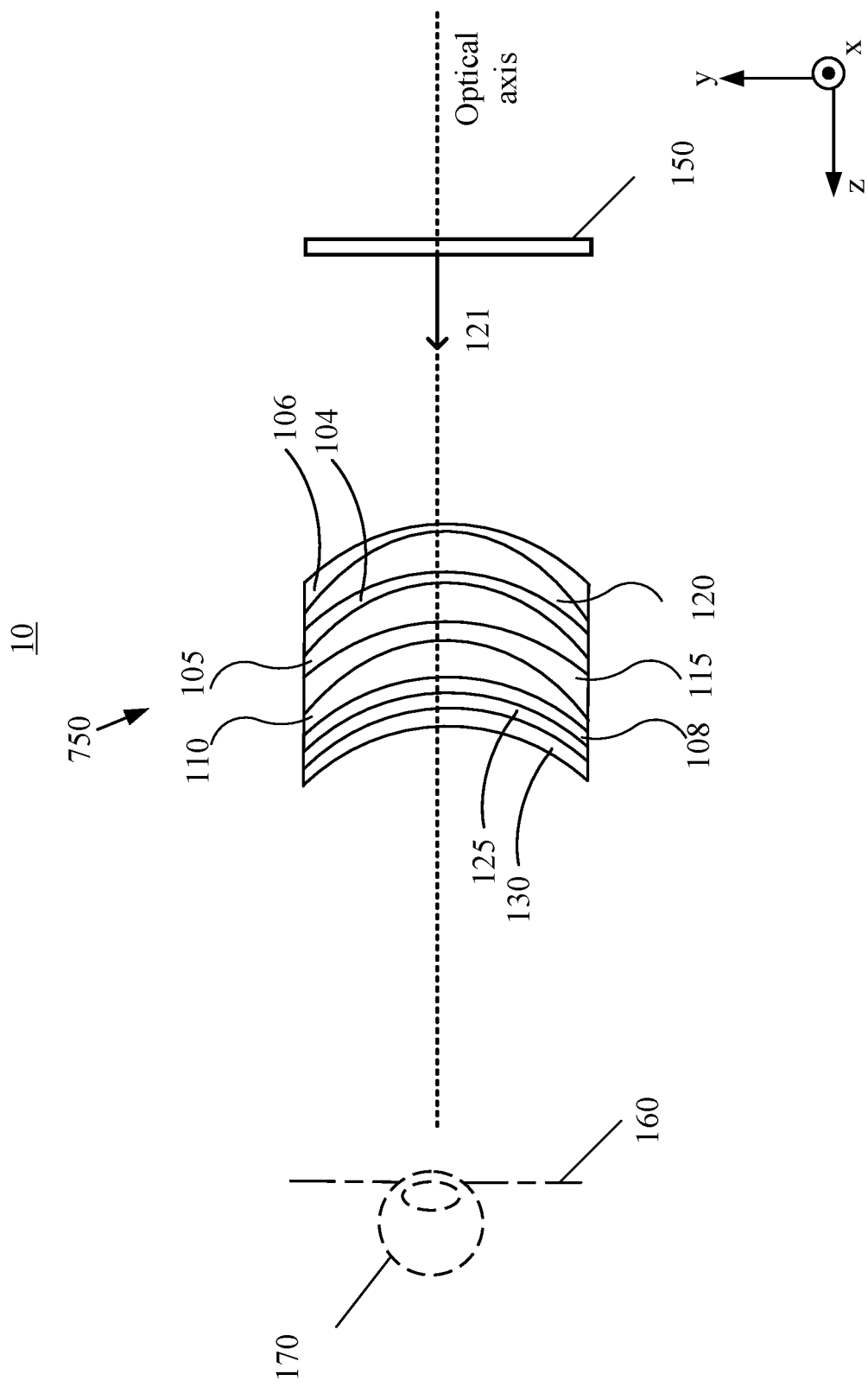
FIG. 7D illustrates a schematic diagram of an optical system including a pancake lens assembly, according to another embodiment of the present disclosure.

FIG. 7B illustrates a schematic optical path of the pancake lens assembly 700 shown in FIG. 7A, according to an embodiment of the present disclosure. The optical path shown in FIG. 7B may include similar or the same optical path segments as the optical path shown in FIG. 5B. Descriptions of the same or similar optical path segments may refer to the above descriptions of FIG. 5B. For discussion purposes, the first CLC reflective polarizer 108 may be an RHCLC reflective polarizer and the second CLC reflective polarizer 106 may be an LHCLC reflective polarizer. As shown in FIG. 7B, the electronic display 150 may emit an unpolarized image light 121 toward the LHCLC reflective polarizer 106. The unpolarized image light 121 may be decomposed into an RHCP light 121R and an LHCP light 121L. The LHCLC reflective polarizer 106 may substantially (e.g., primarily) transmit the RHCP light 121R as an RHCP light 141R toward the mirror 104. A first portion of the RHCP light 141R may be reflected by the mirror 104 as an LHCP light 143L propagating toward the LHCLC reflective polarizer 106, and a second portion of the RHCP light 141R may be transmitted by the mirror 104 as an RHCP light 143R propagating toward the RHCLC reflective polarizer 108. The subsequent optical path of the RHCP light 143R in FIG. 7B may be similar to that of the RHCP light 125R in FIG. 5B, the details of which are not repeated.

On the other hand, the LHCP light 143L may be substantially (e.g., primarily) reflected by the LHCLC reflective polarizer 106 as an LHCP light 144L, a portion of which may be transmitted by the mirror 104 as an LHCP light 146L propagating toward the RHCLC reflective polarizer 108. Then the LHCP light 146L may be substantially (e.g., primarily) transmitted by the RHCLC reflective polarizer 108 as an LHCP light 148L, which may be converted into an s-polarized light 150s by the QWP 125. The s-polarized light 150s may be transmitted through the linear polarizer 130 as an s-polarized light 152s, which may be focused to the eye 170. Through the second CLC reflective polarizer 106 between the electronic display 150 and the mirror 104, the image light 143L reflected by the mirror 104 away from the eye 170, which may not be directed to the eye 170 if the second CLC reflective polarizer 106 were not included, may be reflected back to the eye 170, thereby increasing the light transmittance and achieving a double pancake configuration. The double pancake configuration may be a high transmittance pancake configuration for imaging and illumination applications.

FIG. 7C illustrates a schematic diagram of a pancake lens assembly 730, which may be included in the system 10, according to another embodiment of the present disclosure. The pancake lens assembly 730 shown in FIG. 7C may include elements, structures, or functions that are the same as or similar to those of the pancake lens assembly 500 shown in FIG. 5A, the pancake lens assembly 600 shown in FIG. 6A, or the pancake lens assembly 700 shown in FIG. 7A. Descriptions of the same or similar elements, structures, or functions may refer to the above descriptions with respect to FIG. 5A, FIG. 6A, and FIG. 7A. As shown in FIG. 7C, the first CLC reflective polarizer 108 may be disposed at the second surface of the second optical element 110. The second CLC reflective polarizer 106 and the mirror 104 may be disposed at the first surface of the first optical element 105. The second CLC reflective polarizer 106 may be arranged between the mirror 104 and the electronic display 150. The first optical element 105 and the second optical element 110 may be arranged between the first CLC reflective polarizer 108 and the mirror 104 (also between the first CLC reflective polarizer 108 and the second CLC reflective polarizer 106). The optical path of the pancake lens assembly 730 shown in FIG. 7C may include similar or the same optical path segments as the optical path shown in FIG. 7B. Descriptions of the same or similar optical path segments may refer to the above descriptions of FIG. 7B.

FIG. 7D illustrates a schematic diagram of a pancake lens assembly 750, which may be included in the system 10, according to another embodiment of the present disclosure. The pancake lens assembly 750 shown in FIG. 7D may include elements, structures, or functions that are the same as or similar to those of the pancake lens assembly 500 shown in FIG. 5A, the pancake lens assembly 600 shown in FIG. 6A, the pancake lens assembly 700 shown in FIG. 7A, or the pancake lens assembly 730 shown in FIG. 7C. Descriptions of the same or similar elements, structures, or functions may refer to the above descriptions with respect to FIG. 5A, FIG. 6A, FIG. 7A, and FIG. 7C. As shown in FIG. 7D, the pancake lens assembly 750 may include a third optical element (e.g., a third lens) 120 having a first surface facing a direction toward the electronic display 150 and a second surface facing a direction toward the eye 170. The first optical element 105 may be disposed between the third optical element 120 and the second optical element 110. The first CLC reflective polarizer 108 may be disposed at the second surface of the second optical element 110. The second CLC reflective polarizer 106 may be disposed at the first surface of the third optical element 120. The third optical element 120 may be disposed between the mirror 104 and the second CLC reflective polarizer 106. The first optical element 105 and the second optical element 110 may be disposed between the first CLC reflective polarizer 108 and the mirror 104. The optical path of the pancake lens assembly 750 shown in FIG. 7D may include similar or the same optical path segments as the optical path shown in FIG. 7B. Descriptions of the same or similar optical path segments may refer to the above descriptions of FIG. 7B.

Referring to FIG. 1, FIG. 4, and FIG. 5A to FIG. 7D, the electronic display 150 may be any suitable display. In some embodiments, the electronic display 150 may include a self-emissive panel, such as an organic light-emitting diode ("OLED") display panel, a micro light-emitting diode ("micro-LED") display panel, a quantum dot ("QD") display panel, or a combination thereof. In some embodiments, the electronic display 150 may include a non-emissive display, i.e., a display panel that is illuminated by an external light source, such as a liquid crystal display ("LCD") panel, a liquid-crystal-on-silicon ("LCoS") display panel, or a digital light processing ("DLP") display panel, or a combination thereof. Examples of the external light source may include a laser, an LED, an OLED, or a combination thereof. The external light source may be narrowband or broadband.

In the above descriptions of the various embodiments, an unpolarized image light from the electronic display 150 has been used as an example image light emitted by the electronic display 150. In some embodiments, the electronic display 150 may be configured to emit a circularly polarized image light. The light transmission efficiency of the system 10 may be further increased when the electronic display 150 emits a circularly polarized image light. An example configuration of the electronic display 150 configured to emit a circularly polarized image light is shown in FIG. 8.

Figure 8:
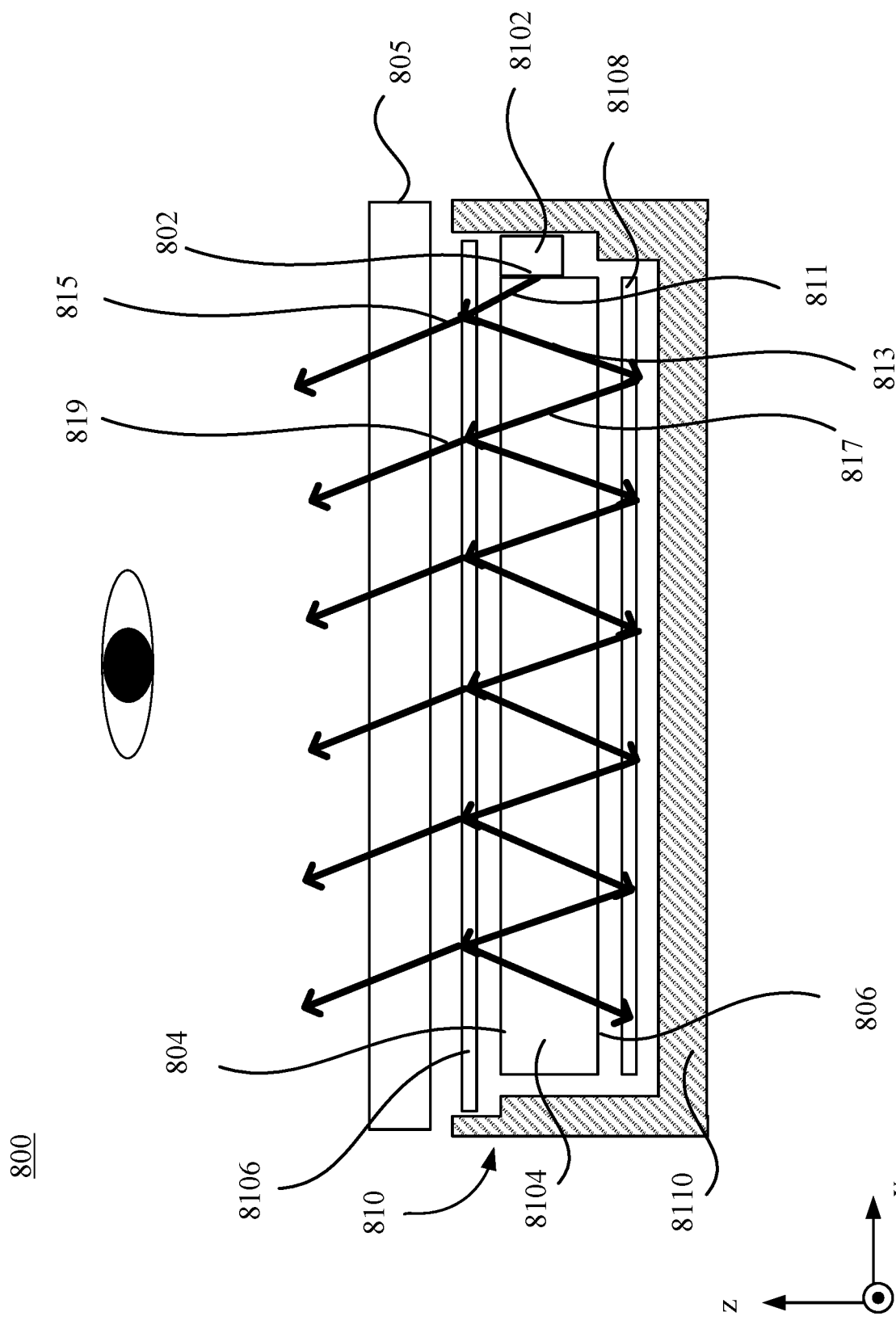
FIG. 8 illustrates a schematic diagram of an electronic display including a CLC reflective polarizer, according to an embodiment of the present disclosure.

FIG. 8 illustrates a schematic electronic display 800 including a circular reflective polarizer, according to an embodiment of the present disclosure. The electronic display 800 may be an embodiment of the electronic display 150 shown in, e.g., FIG. 1, FIG. 5A, FIG. 6A, FIG. 7A, FIG. 7C, and FIG. 7D. As shown in FIG. 8, the electronic display 800 may include a display panel 805 and a backlight module 810. In some embodiments, the display panel 805 may be a non-emissive display panel, such as an LCD panel, an LCoS display panel. The backlight module 810 may be configured to emit a light to illuminate the display panel 805. In some embodiments, the display panel 805 may be an emissive display panel, such as a quantum dot display panel where quantum dots absorb a backlight emitted from the backlight module 810 to emit a visible light.

The backlight module 810 may include a backlight source assembly 8102, a light guide plate 8104, a circular reflective polarizer 8106, a reflector (or reflective sheet) 8108, and a back frame 8110. The backlight module 810 may include other elements, such as a diffuser sheet and/or a prism sheet arranged between the circular reflective polarizer 8106 and the display panel 805. The backlight source assembly 8102 may output backlight to a light incident surface 802 of the light guide plate 8104. The backlight source assembly 8102 may be disposed adjacent the light incident surface 802. The backlight source assembly 8102 may include one or more light-emitting diodes ("LEDs"), an electroluminescent panel ("ELP"), one or more cold cathode fluorescent lamps ("CCFLs"), one or more hot cathode fluorescent lamps ("HCFLs"), or one or more external electrode fluorescent lamps ("EEFLs"), etc. The LED backlight source may include a plurality of white LEDs or a plurality of RGB (red, green, blue) LEDs, etc.

The light guide plate 8104 may be fabricated based on a transparent acryl resin or the like. The backlight entering from the light incident surface 802 may propagate inside the light guide plate 8104, and may exit the light guide plate

8104 at a light output surface 804 to illuminate display function materials, such as liquid crystals, in the display panel 805. The circular reflective polarizer 8106 may be disposed at the light output surface 804 of the light guide plate 8104. The reflector 8108 may be disposed at a bottom surface 806 of the light guide plate 8104, such that the circular reflective polarizer 8106 and reflector 8108 may be disposed at opposite sides of the light guide plate 8104. The circular reflective polarizer 8106 may be configured to selectively transmit a backlight of a first polarization, and selectively reflect a backlight of a second polarization different from the first polarization (e.g., orthogonal to the first polarization) toward the light guide plate 8104. The reflector 8108 may have a substantially high reflectivity (e.g., above 90%) and may convert the backlight of the second polarization into a backlight of the first polarization when reflecting the backlight received from the circular reflective polarizer 8106 back to the circular reflective polarizer 8106. Thus, after being output from the light output surface 804 of the light guide plate 8104, the reflected backlight of the first polarization may be transmitted by the circular reflective polarizer 8106 to illuminate the display panel 805. In this configuration, a polarization recirculation may be achieved by the circular reflective polarizer 8106 and the reflector 8108, which may significantly improve the light efficiency of the backlight module 810. FIG. 8 shows that the reflector 8108 and the circular reflective polarizer 8106 are spaced apart from the light guide plate 8104, and the circular reflective polarizer 8106 is spaced apart from the display panel 805. This configuration is for discussion purposes and is not intended to limit the structural relationship between the reflector 8108 and the circular reflective polarizer 8106 and the light guide plate 8104, and the structural relationship between the circular reflective polarizer 8106 and the display panel 805. The display panel 805, the circular reflective polarizer 8106, the light guide plate 8104, and/or the reflector 8108 may be stacked together without any gap.

In some embodiments, the circular reflective polarizer 8106 may be a CLC reflective polarizer in accordance with an embodiment of the present discourse, such as the CLC reflective polarizer 300 shown in FIG. 3A, the CLC reflective polarizer 320 in FIG. 3B, or the CLC reflective polarizer 340 shown in FIG. 3C. A backlight emitted from the backlight source assembly 8102 may be an unpolarized backlight 811 that may be decomposed into an RHCP backlight or component 815 and an LHCP backlight or component 813. When the unpolarized backlight 811 is incident onto the CLC reflective polarizer 8106, the CLC reflective polarizer 8106 may substantially (e.g., primarily) reflect a circularly polarized backlight having the same handedness as the helix structure of the CLCs of the CLC reflective polarizer 8106 toward the reflector 8108, and substantially (e.g., primarily) transmit a circularly polarized backlight having the opposite handedness toward the display panel 805. For example, the CLC reflective polarizer 8106 may be an LHCLC reflective polarizer, which may substantially (e.g., primarily) reflect the LHCP backlight 813 toward the reflector 8108 and substantially (e.g., primarily) transmit the RHCP backlight 815 toward the display panel 805. The LHCP backlight 813 may be reflected by the reflector 8108 as an RHCP backlight 817 back to the CLC reflective polarizer 8106. The RHCP backlight 817 may be substantially (e.g., primarily) transmitted by the CLC reflective polarizer 8106 as an RHCP backlight 819 toward the display panel 805. In some embodiments, an unpolarized backlight may be incident onto the reflector 8108. The reflected backlight from the reflector 8108 may still be unpolarized and may be incident onto the CLC reflective polarizer 8106. The CLC reflective polarizer 8106 (e.g., an LHCLC reflective polarizer) may substantially (e.g., primarily) reflect an LHCP backlight or component of the unpolarized backlight toward the reflector 8108, and substantially (e.g., primarily) transmit an RHCP backlight or component of the unpolarized backlight toward the display panel 805. The reflector 8108 may reflect the LHCP backlight as an RHCP backlight, which may be substantially (e.g., primarily) transmitted by the CLC reflective polarizer 8106 toward the display panel 805. Due to the handedness selectivity of the CLC reflective polarizer 8106 and the handedness reversion of the reflector 8108, a polarization recirculation of the backlight may be achieved in the light guide plate 805 disposed between the CLC reflective polarizer 8106 and the reflector 8108, which may significantly improve the light efficiency of the backlight module 800.

The CLC reflective polarizer 8106 may be configured according to the characteristics of the backlight source assembly 8102. The reflection band of the CLC reflective polarizer 8106 may be configured to correspond to the wavelength range of the backlight source assembly 8102. For example, when the backlight source assembly 8102 includes a narrowband monochromatic light source (e.g., a 10-nm-bandwidth light source), the CLC reflective polarizer 8106 may be configured as a narrowband CLC reflective polarizer with a constant helix pitch. When the backlight source assembly 8102 includes a broadband light source (e.g., a 300-nm-bandwidth light source covering the visible spectrum), the CLC reflective polarizer 8106 may be configured as a broadband CLC reflective polarizer with a gradient helix pitch. When the backlight source assembly 8102 includes a plurality of narrowband monochromatic light sources of different colors (e.g., narrowband blue, green and red light sources), the CLC reflective polarizer 8106 may be configured to include a plurality of CLC layers stacked together with the CLC layers having different helix pitches (e.g., at least two of the CLC layers may have different helix pitches). In some embodiments, the helix structures of the CLC reflective polarizer 8106 and the CLC reflective polarizer 108 may have opposite handednesses. In some embodiments, when the electronic display 800 is implemented as the electronic display 150 to emit a circularly polarized light toward the pancake lens assemblies shown in FIGS. 1-7D, the circular absorptive polarizer 102 may be omitted. In addition to being implemented with the pancake lens assembly disclosed herein, the electronic display 800 may be implemented along with any other device, assembly, or system to provide a circularly polarized light at a high light transmittance or output efficiency. In addition, the light efficiency of a device, assembly, or system including the electronic display 800 may be improved.

Figure 9:
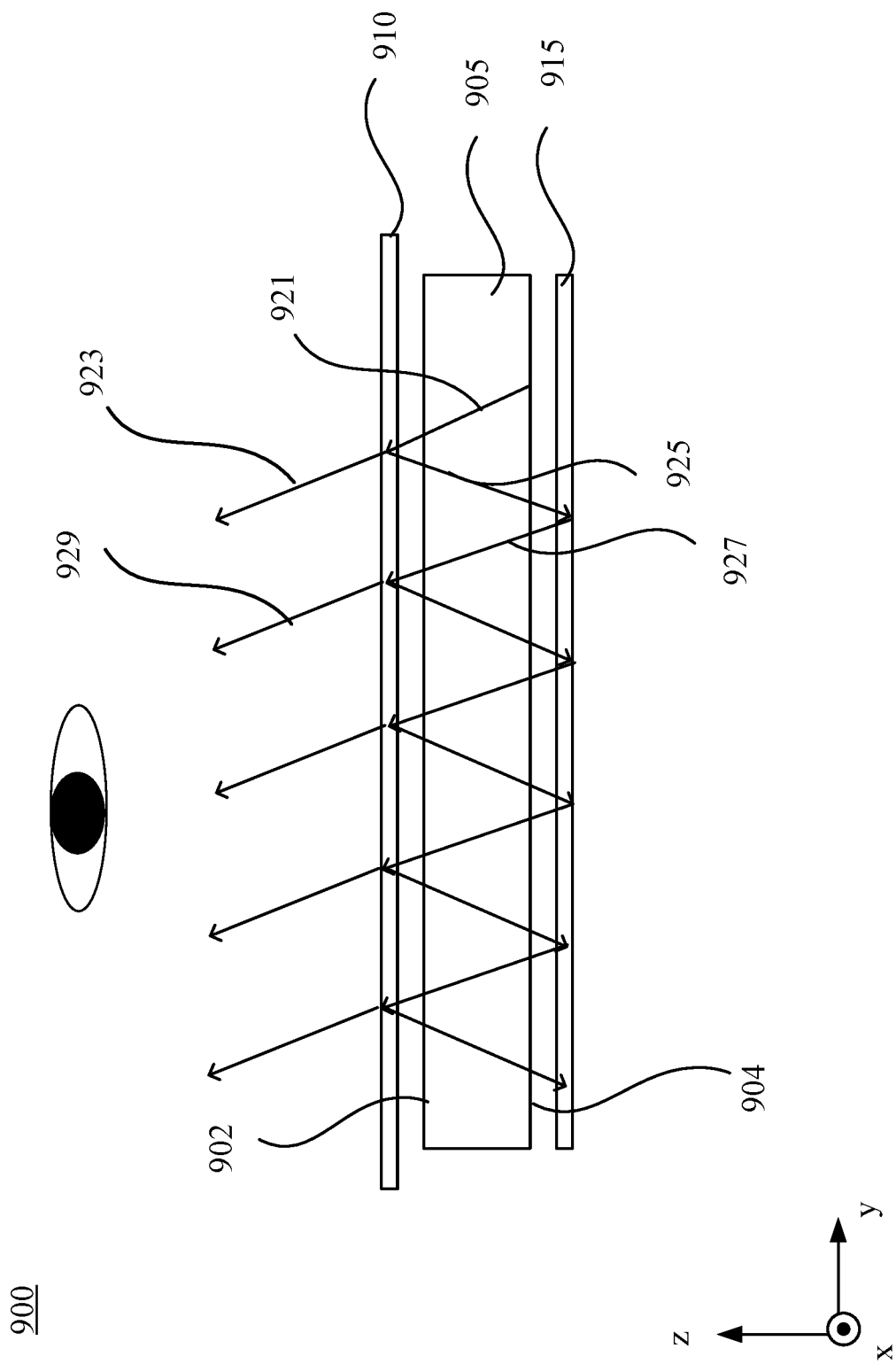
FIG. 9 illustrates a schematic diagram of an electronic display including a CLC reflective polarizer, according to another embodiment of the present disclosure.

FIG. 9 illustrates a schematic diagram of an electronic display 900, according to another embodiment of the present disclosure. The electronic display 900 may be an embodiment of the electronic display 150 shown in FIG. 1, FIG. 5A, FIG. 6A, FIG. 7A, FIG. 7C, and FIG. 7D. The electronic display 900 shown in FIG. 9 may include elements, structures, or functions that are the same as or similar to those of the electronic display 800 shown in FIG. 8. Descriptions of the same or similar elements, structures, or functions may refer to the descriptions rendered above in connection with FIG. 8. In addition to being implemented with the pancake lens assembly disclosed herein, the electronic display 900 may be implemented along with any other device, assembly, or system to provide a circularly polarized light at a high light transmittance or output efficiency.

As shown in FIG. 9, the electronic display 900 may include a display panel 905 disposed between a circular reflective polarizer 910 and a reflector 915. The display panel 905 may be a self-emissive panel, such as an OLED display panel, a micro-LED display panel, or a combination thereof. The display panel 905 may have a first surface 902 facing a viewer (e.g., an eye of the viewer, or a pancake lens assembly disclosed herein) and an opposing, parallel second surface 904. The first surface 902 may be a light output surface 902 where an image light is output toward the viewer (or a pancake lens assembly disclosed herein). The circular reflective polarizer 910 and the reflector 915 may be disposed at the first surface 902 and the second surface 904 of the display panel 905, respectively.

In some embodiments, the circular reflective polarizer 910 may be a CLC reflective polarizer 910, such as the CLC reflective polarizer 300 shown in FIG. 3A, the CLC reflective polarizer 320 shown in FIG. 3B, or the CLC reflective polarizer 340 shown in FIG. 3C. In some embodiments, an image light 921 emitted from the display panel 905 may be an unpolarized image light that may be decomposed into an RHCP image light or component 923 and an LHCP image light or component 925. In some embodiments, the unpolarized image light 921 may be incident onto the CLC reflective polarizer 910, which may substantially (e.g., primarily) reflect a circularly polarized image light having the same handedness as the helix structure of the CLCs of the CLC reflective polarizer 910 toward the reflector 915, and substantially (e.g., primarily) transmit a circularly polarized image light with an opposite handedness toward the viewer (or a pancake lens assembly disclosed herein). For example, the CLC reflective polarizer 910 may be an LHCLC reflective polarizer, which may substantially (e.g., primarily) reflect the LHCP image light 925 toward the reflector 915 and substantially (e.g., primarily) transmit the RHCP image light 923 toward the viewer (or a pancake lens assembly disclosed herein). The LHCP image light 925 propagating toward the reflector 915 may be reflected by reflector 915 as an RHCP image light 927, which may be further transmitted by the CLC reflective polarizer 910 as an RHCP image light 929 toward the viewer (or a pancake lens assembly disclosed herein). In some embodiments, an unpolarized image light may be incident onto the reflector 915 directly, the reflected image light may remain unpolarized and be incident onto the CLC reflective polarizer 910 after being transmitted through the display panel 905. The LHCP image light or component of the unpolarized image light may be substantially (e.g., primarily) reflected by the CLC reflective polarizer 910 toward the reflector 915, and the RHCP image light or component of the unpolarized image light may be substantially (e.g., primarily) transmitted by the CLC reflective polarizer 910 toward the viewer (or a pancake lens assembly disclosed herein). The reflector 915 may reflect the LHCP image light as an RHCP image light, which may be further transmitted through the CLC reflective polarizer 910 toward the viewer (or a pancake lens assembly disclosed herein). Due to the handedness selectivity of the CLC reflective polarizer 910 and the handedness reversion of the reflector 915, a polarization recirculation of the image light may be achieved, which may significantly improve the light transmission efficiency of the display panel 905.

The structure of the CLC reflective polarizer 910 may be determined according to the characteristics of the display panel 905. The reflection band of the CLC reflective polarizer 910 may correspond to the wavelength range of the image light emitted by the display panel 905. For example, when the image light emitted by the display panel 905 is a narrowband monochromatic light (e.g., a 10-nm-bandwidth monochromatic light), the CLC reflective polarizer 910 may be configured as a narrowband CLC reflective polarizer with a constant helix pitch. When the image light emitted by the display panel 905 is a broadband light (e.g., a 300-nm-bandwidth light covering the visible spectrum), the CLC reflective polarizer 910 may be configured as a broadband CLC reflective polarizer with a gradient helix pitch. When the image light emitted by the display panel 905 includes a plurality of narrowband monochromatic lights of different colors (e.g., narrowband blue light, green light and red light), the CLC reflective polarizer 910 may be configured to include a plurality of CLC layers stacked together with the CLC layers having different helix pitches. In some embodiments, the helix structures of the CLC reflective polarizer 910 and the CLC reflective polarizer 108 may have opposite handednesses.

In some embodiments, the display panel 905 may include one or more substrates for supporting and protection purposes, an anode, an emissive layer, and a cathode disposed on the substrate. Under a typical bias condition, electrons and holes may be injected from the respective electrodes into the emissive layer, where the recombination of the electrons and holes may result in light emission from the emissive layer. In some embodiments, both the anode and the cathode may be transparent electrodes, and the reflector 915 may be disposed adjacent one of the anode and the cathode. In some embodiments, one of the anode and cathode may be a transparent electrode and the other may be a reflective electrode, such as a metal electrode with a high reflectivity. The reflective electrode may be arranged at the second surface 904 of the display panel 905 and function as the reflector to realize a polarization recirculation of the image light together with the CLC reflective polarizer 910. Thus, the reflector 915 may be omitted.

Figure 10A:
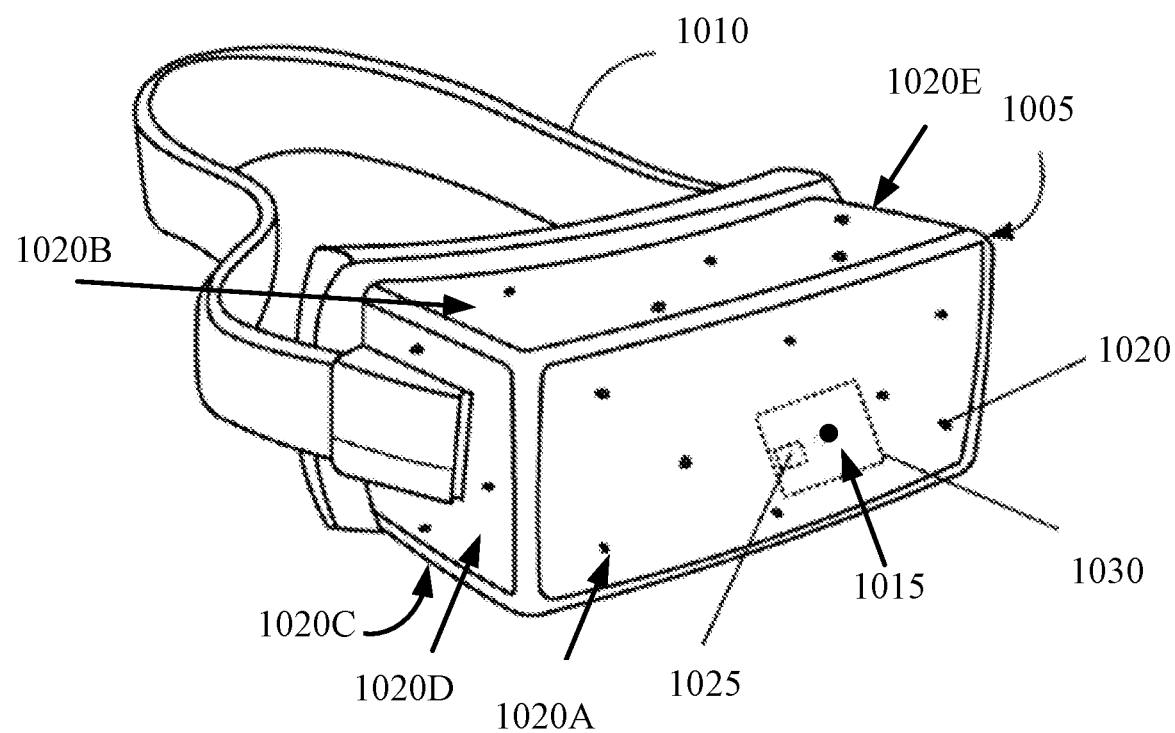
FIG. 10A illustrates a diagram of a near-eye display ("NED"), according to an embodiment of the present disclosure.

FIG. 10A illustrates a diagram of a near-eye display ("NED") 1000, according to another embodiment of the present disclosure. As shown in FIG. 10A, the NED 1000 may include a front body 1005 and a band 1010. The front body 1005 may include one or more electronic display elements of the electronic display and optics block (not shown in FIG. 10A), an inertial measurement unit ("IMU") 1030, one or more position sensors 1025, and one or more locators 1020. In the embodiment shown in FIG. 10A, the position sensors 1025 may be located within the IMU 1030. The locators 1020 may be located at fixed positions on the front body 1005 relative to one another and relative to a reference point 1015. In the embodiment shown in FIG. 10A, the reference point 1015 may be located at the center of the IMU 1030. One or more of the locators 1020 may be located on a front side 1020A, a top side 1020B, a bottom side 1020C, a right side 1020D, and a left side 1020E of the front body 1005.

Figure 10B:
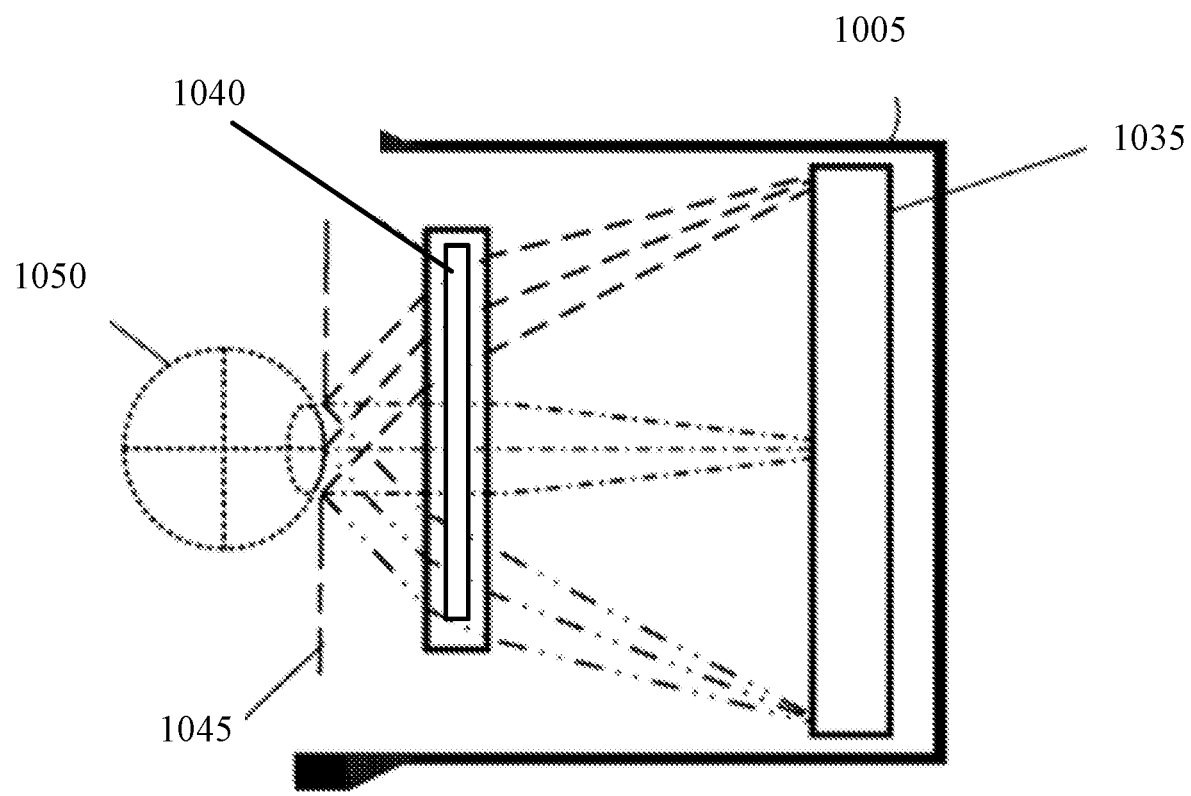
FIG. 10B schematically illustrates a cross sectional view of a front body of the NED shown in FIG. 10A, according to an embodiment of the present disclosure.

FIG. 10B is a cross-sectional view of the front body 1005 of the NED 1000 shown in FIG. 10A. As shown in FIG. 10B, the front body 1005 may include an electronic display 1035 and a pancake lens assembly 1040 configured to provide an image light of predetermined properties to an exit pupil 1045. The electronic display 1035 may be any electronic display disclosed herein, such as the electronic display 150 shown in e.g., FIG. 1, the electronic display 800 shown in FIG. 8, or the electronic display 900 shown in FIG. 9. The pancake lens assembly 1040 may be any pancake lens assembly disclosed herein, such as the pancake lens assembly 100 shown in FIG. 1, the pancake lens assembly 500 shown in FIG. 5A, the pancake lens assembly 600 shown in FIG. 6A, the pancake lens assembly 700 shown in FIG. 7A, the pancake lens assembly 730 shown in FIG. 7C, or the pancake lens assembly 750 shown in FIG. 7D. The exit pupil 1045 may be at a location of the front body 1005 where an eye 1050 of a user may be positioned. For illustrative purposes, FIG. 10B shows a cross-section of the front body 1005 associated with a single eye 1050. In some embodiments, another electronic display separate from the electronic display 1035 may be provided for another eye of the user.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive. The disclosed embodiments described in the specification and/or shown in the drawings be combined in any suitable manner. For example, elements shown in one embodiment (e.g., in one figure) but not another embodiment (e.g., in another figure) may nevertheless be included in the other embodiment. Elements shown in one embodiment (e.g., in one figure) may be repeated to form a stacked configuration. Elements shown in different embodiments (e.g., in different figures) may be combined to form a variation of the disclosed embodiments. Elements shown in different embodiments may be repeated and combined to form variations of the disclosed embodiments. Elements mentioned in the descriptions but not shown in the figures may still be included in a disclosed embodiment or a variation of the disclosed embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a light source configured to generate an image light; and
a lens assembly coupled with the light source and including:
   a mirror configured to transmit a first portion of the image light and reflect a second portion of the image light;
   a first reflective polarizer including a birefringent medium with a chirality and configured to substantially reflect the first portion of the image light output from the mirror as a polarized light having a predetermined handedness toward the mirror;
   a lens disposed between the mirror and the first reflective polarizer and configured to provide an optical power to the image light; and
   a second reflective polarizer disposed between the mirror and the light source, and configured to substantially reflect the second portion of the image light output from the mirror toward the mirror.

2. The device of claim 1, wherein
the polarized light having the predetermined handedness is a first circularly polarized light having a first handedness,
the mirror is further configured to reflect the first circularly polarized light having the first handedness as a second circularly polarized light having a second handedness opposite to the first handedness toward the first reflective polarizer, and the first reflective polarizer is further configured to substantially transmit the second circularly polarized light having the second handedness.

3. The device of claim 1, wherein a reflection band of the first reflective polarizer corresponds to a spectrum of the image light.

4. The device of claim 1, wherein the birefringent medium with the chirality includes a cholesteric liquid crystal ("CLC") layer having a constant helix pitch or a gradient helix pitch.

5. The device of claim 1, wherein the birefringent medium with the chirality includes a plurality of stacked CLC layers having different constant helix pitches.

6. The device of claim 1, wherein
the birefringent medium with the chirality is a first birefringent medium with a first chirality, and the polarized light having the predetermined handedness is a first circularly polarized light having a first handedness, and
the second reflective polarizer includes a second birefringent medium with a second chirality, the second reflective polarizer being configured to substantially reflect the second portion of the image light output from the mirror as a second circularly polarized light having a second handedness opposite to the first handedness toward the mirror.

7. The device of claim 6, wherein
the mirror is configured to transmit a first portion of the second circularly polarized light having the second handedness toward the first reflective polarizer, and
the first reflective polarizer is configured to substantially transmit the first portion of the second circularly polarized light having the second handedness as a third circularly polarized light having the second handedness.

8. The device of claim 6, wherein
the first birefringent medium with the first chirality includes at least one first CLC layer,
the second birefringent medium with the second chirality includes at least one second CLC layer, and
helical structures of the at least one first CLC layer and the at least one second CLC layer have opposite handednesses.

9. The device of claim 6, wherein
the light source further includes a third reflective polarizer including a third birefringent medium with a third chirality.

10. The device of claim 9, wherein
the first birefringent medium with the first chirality includes at least one first CLC layer,
the third birefringent medium with the third chirality includes at least one third CLC layer, and
helical structures of the at least one first CLC layer and the at least one third CLC layer have opposite handednesses.

11. The device of claim 9, wherein the light source further includes a reflector and a display panel disposed between the third reflective polarizer and the reflector.

12. The device of claim 11, wherein
the display panel is an emissive display panel configured to emit an unpolarized image light including a first circularly polarized component having the first handedness and a second circularly polarized component having the second handedness opposite to the first handedness, and
the third reflective polarizer is configured to substantially transmit the first circularly polarized component having the first handedness, and substantially reflect the second circularly polarized component having the second handedness toward the reflector.

13. The device of claim 9, wherein
the light source further includes a display panel and a backlight module configured to illuminate the display panel, and
the backlight module includes:
a backlight source assembly;
a light guide plate optically coupled with the backlight source assembly;
the third reflective polarizer disposed at a first side of the light guide plate; and
a reflector disposed at a second side of the light guide plate.

14. The device of claim 13, wherein
the backlight source assembly is configured to emit an unpolarized image light including a first circularly polarized component having the first handedness and a second circularly polarized component having the second handedness opposite to the first handedness, and
the third reflective polarizer is configured to substantially transmit the first circularly polarized component having the first handedness, and substantially reflect the second circularly polarized component having the second handedness toward the reflector.

15. The device of claim 1, wherein
the lens is a first lens disposed between the mirror and the first reflective polarizer,
the device further includes a second lens disposed between the mirror and the second reflective polarizer, and
the mirror is disposed between the first reflective polarizer and the second reflective polarizer.

16. A device, comprising:
a light source configured to generate an image light; and
a lens assembly coupled with the light source and including:
a mirror configured to transmit a first portion of the image light and reflect a second portion of the image light;
a reflective polarizer including a birefringent medium with a chirality and configured to substantially reflect the first portion of the image light output from the mirror as a polarized light having a predetermined handedness toward the mirror; and
a lens disposed between the mirror and the reflective polarizer and configured to provide an optical power to the image light,
wherein the reflective polarizer has a first side facing the lens and a second side opposite to the first side, the device further comprises:
a linear polarizer disposed at the second side of the reflective polarizer; and
a quarter-wave plate disposed between the linear polarizer and the reflective polarizer.

17. The device of claim 16, wherein
the quarter-wave plate disposed between the linear polarizer and the reflective polarizer is a first quarter-wave plate,
the device further includes a second quarter-wave plate, and
the linear polarizer is disposed between the first quarter-wave plate and the second quarter-wave plate.

18. A lens assembly, comprising:
a mirror configured to transmit a first portion of a light and reflect a second portion of the light;

a first reflective polarizer including a birefringent medium with a chirality and configured to substantially reflect the first portion of the light output from the mirror as a polarized light having a predetermined handedness toward the mirror, the first reflective polarizer being disposed at a first side of the mirror;

a lens disposed between the mirror and the first reflective polarizer and configured to provide an optical power to the light; and a second reflective polarizer disposed at a second side of the mirror and configured to substantially reflect the second portion of the light output from the mirror toward the mirror.

19. The lens assembly of claim 18, wherein the lens is a first lens, the lens assembly further includes a second lens disposed between the mirror and the second reflective polarizer, and the mirror is disposed between the first reflective polarizer and the second reflective polarizer.

20. The lens assembly of claim 18, wherein the polarized light having the predetermined handedness is a first circularly polarized light having a first handedness, the mirror is further configured to reflect the first circularly polarized light having the first handedness as a second circularly polarized light having a second handedness opposite to the first handedness toward the first reflective polarizer, and the first reflective polarizer is further configured to substantially transmit the second circularly polarized light having the second handedness as a third circularly polarized light having the second handedness.

* * * * *